US011970266B2

(12) United States Patent
Kuroiwa et al.

(10) Patent No.: US 11,970,266 B2
(45) Date of Patent: Apr. 30, 2024

(54) UNMANNED AERIAL VEHICLE, FLIGHT CONTROL MECHANISM FOR UNMANNED AERIAL VEHICLE, AND METHOD FOR USING UNMANNED AERIAL VEHICLE AND MECHANISM FOR UNMANNED AERIAL VEHICLE

(71) Applicants: ACSL Ltd., Tokyo (JP); NJS Co., Ltd., Tokyo (JP)

(72) Inventors: Kenji Kuroiwa, Osaka (JP); Shosuke Inoue, Tokyo (JP); Yusuke Inagaki, Suita (JP)

(73) Assignees: ACSL, Ltd., Tokyo (JP); NJS Co., Ltd., Tokyo (JP)

( * ) Notice: Subject to any disclaimer, the term of this patent is extended or adjusted under 35 U.S.C. 154(b) by 653 days.

(21) Appl. No.: 17/046,384

(22) PCT Filed: Apr. 10, 2018

(86) PCT No.: PCT/JP2018/015100
§ 371 (c)(1),
(2) Date: Oct. 9, 2020

(87) PCT Pub. No.: WO2019/198155
PCT Pub. Date: Oct. 17, 2019

(65) Prior Publication Data
US 2021/0147078 A1 May 20, 2021

(51) Int. Cl.
*B64C 39/02* (2023.01)
*B64C 27/08* (2023.01)
(Continued)

(52) U.S. Cl.
CPC ............ *B64C 39/024* (2013.01); *B64C 27/08* (2013.01); *B64C 27/20* (2013.01); *E03F 7/00* (2013.01);
(Continued)

(58) Field of Classification Search
CPC ....... B64C 39/024; B64C 27/08; B64C 27/20; H04N 23/90; H04N 7/181; E03F 7/00; F16L 55/38
(Continued)

(56) References Cited

U.S. PATENT DOCUMENTS 9,592,908 B2  3/2017 Gentry
10,640,204 B2  5/2020 Welch
(Continued)

FOREIGN PATENT DOCUMENTS

CN  101491898 A  7/2009
CN  103217983 A  7/2013
(Continued)

OTHER PUBLICATIONS

International Search Report dated Jul. 10, 2018, issued in connection with International Application No. PCT/JP2018/015100, filed on Apr. 10, 2018, 4 pages.
(Continued)

*Primary Examiner* — Peter D Nolan
*Assistant Examiner* — Luke Huynh
(74) *Attorney, Agent, or Firm* — McDonnell Boehnen Hulbert & Berghoff LLP

(57) ABSTRACT

The purpose of the present invention is to provide a flight control mechanism for controlling flight of an unmanned aerial vehicle by controlling collision between the vehicle and a boundary surface, an unmanned aerial vehicle equipped with the mechanism, and a method for using the mechanism and the vehicle. Provided is a flight control mechanism for an unmanned aerial vehicle including: a first initial collision member; a second initial collision member; and a holding member that holds the first and second initial collision members with a space therebetween above the body of the unmanned aerial vehicle, is tiltable with respect
(Continued)

to the vehicle body by rotating about a predetermined position inside or above the vehicle body toward the side of the vehicle body, and rotates in response to collision between the first or second initial collision member and a boundary surface.

10 Claims, 21 Drawing Sheets

(51) Int. Cl.
*B64C 27/20* (2023.01)
*E03F 7/00* (2006.01)
*F16L 55/38* (2006.01)
*H04N 7/18* (2006.01)
*H04N 23/90* (2023.01)
*B64D 43/00* (2006.01)
*B64D 47/08* (2006.01)
*B64U 10/13* (2023.01)
*B64U 30/20* (2023.01)
*B64U 101/30* (2023.01)
*F16L 101/30* (2006.01)
*H04N 23/50* (2023.01)

(52) U.S. Cl.
CPC .............. *F16L 55/38* (2013.01); *H04N 7/181* (2013.01); *H04N 23/90* (2023.01); *B64D 43/00* (2013.01); *B64D 47/08* (2013.01); *B64U 10/13* (2023.01); *B64U 30/20* (2023.01); *B64U 2101/30* (2023.01); *B64U 2201/10* (2023.01); *F16L 2101/30* (2013.01); *H04N 23/555* (2023.01)

(58) Field of Classification Search
USPC .............................................................. 701/3
See application file for complete search history.

(56) References Cited

U.S. PATENT DOCUMENTS

| | | | |
|---|---|---|---|
| 11,235,890 B1* | 2/2022 | Dahlstrom | B05C 11/1005 |
| 2010/0013917 A1 | 1/2010 | Hanna et al. | |
| 2014/0361111 A1 | 12/2014 | Hyun et al. | |
| 2016/0129998 A1 | 5/2016 | Welsh et al. | |
| 2016/0375997 A1 | 12/2016 | Welsh et al. | |
| 2016/0378108 A1 | 12/2016 | Paczan et al. | |
| 2017/0122736 A1 | 5/2017 | Dold et al. | |
| 2017/0274995 A1 | 9/2017 | Yamada et al. | |
| 2017/0369166 A1 | 12/2017 | van den Heuvel | |
| 2018/0217614 A1 | 8/2018 | Salas-Moreno | |
| 2018/0251212 A1* | 9/2018 | Sugaki | B64C 25/34 |
| 2019/0106206 A1* | 4/2019 | Shi | B64C 11/001 |
| 2019/0366375 A1 | 12/2019 | Thompson et al. | |
| 2020/0377211 A1 | 12/2020 | Daddi | |

FOREIGN PATENT DOCUMENTS

| | | |
|---|---|---|
| CN | 204507256 U | 7/2015 |
| CN | 205499350 U | 8/2016 |
| CN | 205707410 U | 11/2016 |
| CN | 106245524 A | 12/2016 |
| CN | 106628149 A | 5/2017 |
| CN | 107207087 A | 9/2017 |
| JP | 2005-193727 A | 7/2005 |
| JP | 2006-051841 A | 2/2006 |
| JP | 2013-000059 A | 1/2013 |
| JP | 2014-236728 A | 12/2014 |
| JP | 2014-239665 A | 12/2014 |
| JP | 2015-194069 A | 11/2015 |
| JP | 2015-223995 A | 12/2015 |
| JP | 2016-211878 A | 12/2016 |
| JP | 2017-036988 A | 2/2017 |
| JP | 2017-061298 A | 3/2017 |
| JP | 2017-087917 A | 5/2017 |
| JP | 2017-136914 A | 8/2017 |
| JP | 2017-171032 A | 9/2017 |
| JP | 2017-191026 A | 10/2017 |
| JP | 2017532256 A | 11/2017 |
| JP | 2017-226259 A | 12/2017 |
| JP | 2018-001967 A | 1/2018 |
| JP | 2018-505094 A | 2/2018 |
| JP | 2018505818 A | 3/2018 |
| JP | 2018510805 A | 4/2018 |
| KR | 20170138015 A | 12/2017 |
| KR | 10-2018-0012136 A | 2/2018 |
| KR | 10-2018-0012194 A | 2/2018 |
| WO | 2017/183219 A1 | 10/2017 |
| WO | 2019037036 A1 | 2/2019 |

OTHER PUBLICATIONS

Written Opinion dated Jul. 10, 2018, issued in connection with International Application No. PCT/JP2018/015100, filed on Apr. 10, 2018, 5 pages.

* cited by examiner

UNMANNED AERIAL VEHICLE, FLIGHT CONTROL MECHANISM FOR UNMANNED AERIAL VEHICLE, AND METHOD FOR USING UNMANNED AERIAL VEHICLE AND MECHANISM FOR UNMANNED AERIAL VEHICLE

CROSS-REFERENCE TO RELATED APPLICATIONS

This application is a U.S. National Phase Application under 35 U.S.C. § 371 of International Application No. PCT/JP2018/015100, filed Apr. 10, 2018, the disclosure of which is incorporated herein by reference in its entirety.

TECHNICAL FIELD

The present invention relates to an unmanned aerial vehicle, a flight control mechanism for an unmanned aerial vehicle, and a method for using an unmanned aerial vehicle and a mechanism for an unmanned aerial vehicle. More specifically, the present invention relates to a flight control mechanism for controlling flight of an unmanned aerial vehicle, an unmanned aerial vehicle with the mechanism and a method using them in an environment including the inside of a closed-type space such as the inside of a tubular space or the inside of a rectangular space where collisions with some boundary surface may occur.

BACKGROUND ART

The useful life of a sewage pipeline (sewer conduit) is set to approximately 50 years, and it is assumed that facilities that have reached the end of their useful life will exponentially increases in the future. For efficient maintenance and management, it is essential to grasp a state of the sewage pipeline.

As a method of inspecting the state of the sewage pipeline, a method of an inspector moving in a pipe to perform direct visual inspection, a method of arranging a television camera connected to the ground via a cable in a pipe to perform shooting, a method of loading a television camera connected to the ground via a cable into a self-propelled vehicle and arranging the television camera in a pipe to perform shooting while traveling, and the like have been used. However, in the method of the direct visual inspection by the inspector, there are various problems such as a risk of a toxic gas being produced in the sewage pipeline to affect a human body and a risk from immersion at the time of sudden rainfall. In the method of arranging the television camera in the pipe, there are also problems that a sufficient inspection speed is not obtained and a vehicle is difficult to control when a water level in the sewage pipeline rises.

In flying an unmanned aerial vehicle in not only the sewage pipeline but also an environment where a collision with any boundary surface such as a wall surface or a ceiling may occur, controllability of the unmanned aerial vehicle may be deteriorated by the collision with the boundary surface, or an vehicle body may be damaged in some cases.

CITATION LIST

Patent Literature

Patent Literature 1: Japanese Patent Laid-Open No. 2017-087917

Patent Literature 2: Japanese Patent Laid-Open No. 2017-226259

Patent Literature 3: Japanese Patent Laid-Open No. 2018-001967

SUMMARY OF INVENTION

Technical Problem

An object of the present invention is to provide a flight control mechanism for controlling flight of an unmanned aerial vehicle by controlling collisions with boundary surfaces, an unmanned aerial vehicle with the mechanism and a method using them.

Solution to Problem

To solve the above-described problems, the present invention provides a flight control mechanism for an unmanned aerial vehicle comprising: a first preceding collision member; a second preceding collision member; and a holding member which holds the first and the second preceding collision members with a distance above a vehicle body of an unmanned aerial vehicle, wherein the holding member can be inclined with respect to the vehicle body by rotating toward the lateral side of the vehicle body around a predetermined position in the vehicle body or on the vehicle body, and the holding member rotates responsive to one of the first and the second preceding collision members colliding with a boundary surface.

In the flight control mechanism, the holding member may be configured to rotate responsive to one of the first and the second preceding collision members colliding with the boundary surface so that both of the first and the second preceding collision members touch the boundary surface according to ascension of the vehicle body.

In the flight control mechanism, the first and the second preceding collision members may be rotary members, and the flight control mechanism may be configured so that the first and the second rotary members rotate when the unmanned aerial vehicle flies while the first and the second rotary members are touching the boundary surface.

In addition, the present invention provides the unmanned aerial vehicle comprising two or more flight control mechanisms in front and behind with a distance, wherein the unmanned aerial vehicle is configured to fly along the boundary surface by flying with first and the second preceding collision members of the respective flight control mechanisms touching the boundary surface.

The unmanned aerial vehicle may be configured as an unmanned aerial vehicle comprising: at least four rotary wings; a drive device which drives the rotary wings; and a control signal generation unit which generates a control signal for causing the drive device to drive the rotary wings.

The unmanned aerial vehicle may comprise: two sets of rotary wings as the at least four rotary wings where each set consists of two rotary wings distanced in left and right; and the flight control mechanism for each one set of the two sets wherein in each set, the predetermined position is below the positions of the two rotary wings included in that set in a state where the vehicle body is not inclined.

The control signal may include an attitude control signal, and the unmanned aerial vehicle may be configured to control the attitude of the unmanned aerial vehicle by causing the drive device to drive the rotary wings with the attitude control signal to reduce the number of rotations of at least one or some of the rotary wings when the unmanned aerial vehicle is inclined.

In the unmanned aerial vehicle, the drive device may include a plurality of motors which respective motors provide the respective rotary wings with motive powers, respectively, and respective motors may be configured to provide respective rotary wings with motive powers, respectively, at a position with a higher gravitational potential than the rotary wing which receives motive power from the each motor.

The unmanned aerial vehicle may further comprise a thrust generation propeller, and the unmanned aerial vehicle may be configured to propel by rotations of the thrust generation propeller while floating by rotations of the at least four rotary wings.

The unmanned aerial vehicle may further comprise a shooting camera and may be configured to fly inside a closed-type space by driving the rotary wings while shooting inside the closed-type space using the shooting camera.

The unmanned aerial vehicle may further comprises a traveling direction shooting camera and a traveling direction shooting data transmission unit, and the unmanned aerial vehicle may be configured to fly while shooting in the traveling direction by means of the traveling direction shooting camera and transmitting obtained traveling direction shooting data from the traveling direction shooting data transmission unit to the outside.

In addition, the present invention provides a method for flying an unmanned aerial vehicle along a boundary surface, the unmanned aerial vehicle comprises two or more flight control mechanisms in front and behind with a distance, each flight control mechanism comprises:

a first preceding collision member;
a second preceding collision member; and
a holding member which holds the first and the second preceding collision members separately above a vehicle body of an unmanned aerial vehicle, wherein the holding member can be inclined with respect to the vehicle body by rotating toward the lateral side of the vehicle body around a predetermined position in the vehicle body or on the vehicle body, and the holding member rotates responsive to one of the first and the second preceding collision members colliding with a boundary surface and makes both of the first and the second preceding collision members touch the boundary surface according to ascension of the vehicle body, the method comprises flying the unmanned aerial vehicle in a state where the first and the second preceding collision members of the respective flight control mechanisms are touching the boundary surface.

Advantageous Effect of Invention

By controlling flight of an unmanned aerial vehicle according to the present invention, the risk of damages to the vehicle body, reduction of controllability etc. according to collisions when flying the unmanned aerial vehicle in an environment where collisions with a boundary surface may occur, is at least reduced.

DESCRIPTION OF EMBODIMENTS

Figure 1A:
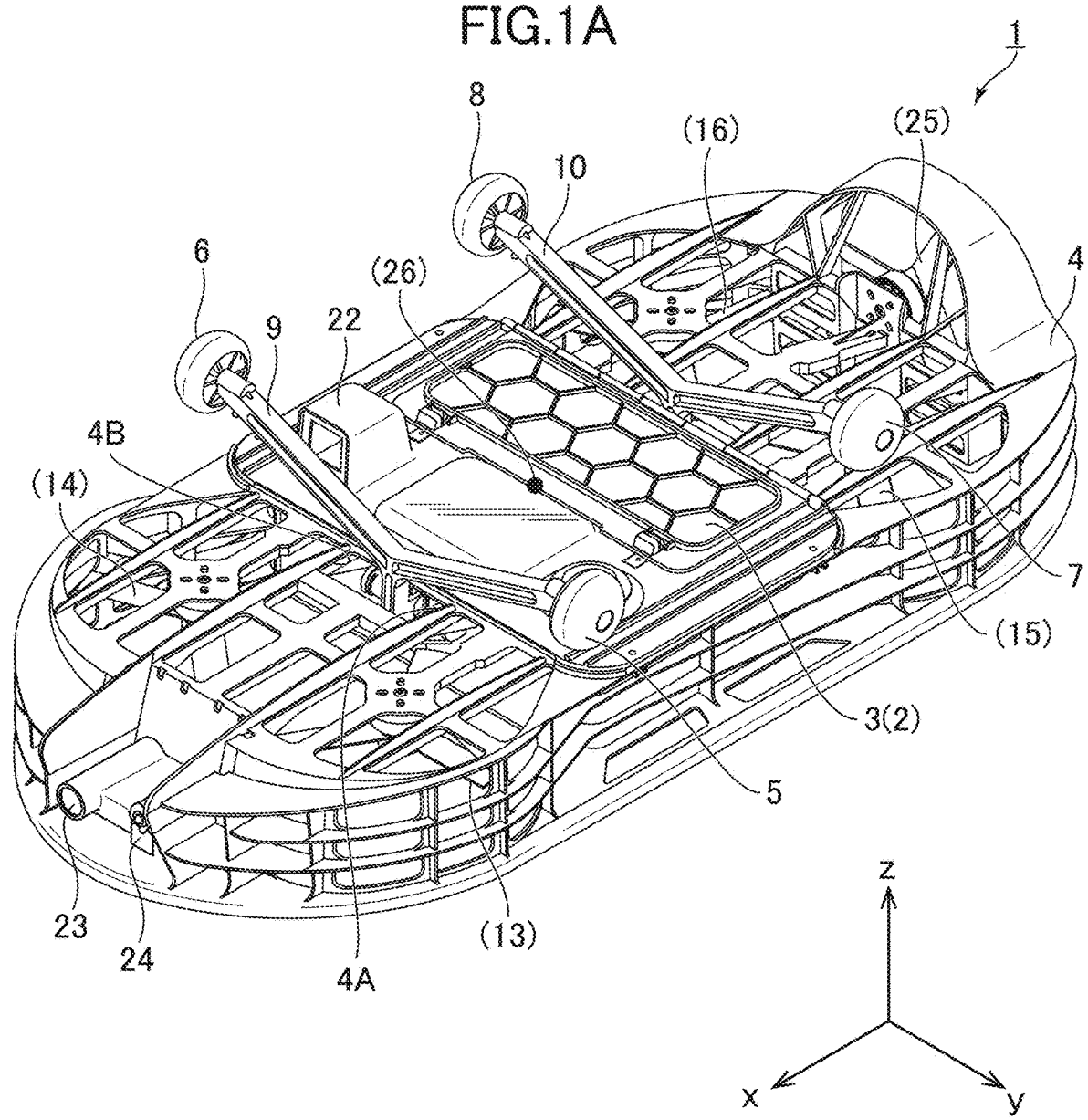
FIG. 1A is a perspective view of an unmanned aerial vehicle according to an embodiment of the present embodiment.

An unmanned aerial vehicle, a flight control mechanism for the unmanned aerial vehicle, and a method using these according to an embodiment of the present invention will be described below with reference to the drawings. Note that the unmanned aerial vehicle, the flight control mechanism for the unmanned aerial vehicle, and the method using these are not limited to a specific mode described below, but are appropriately changeable within the scope of the present invention. For example, the unmanned aerial vehicle according to the present invention is not necessarily an autonomous flight type unmanned aerial vehicle, and a functional configuration of the unmanned aerial vehicle is not limited to that illustrated in FIG. 9, but is also arbitrary if a similar operation can be performed. For example, operations to be performed by a plurality of components may be performed by a single component, for example, a function of a communication unit is integrated with a main operation unit. Alternatively, an operation to be performed by a single component as illustrated may be performed by a plurality of components, for example, a function of a main operation unit is distributed among a plurality of operation units. An autonomous control program of the unmanned aerial vehicle may be recorded on a recording device such as a hard disk drive and read out and executed by the main operation unit (The autonomous control program as illustrated may be decomposed into a plurality of program modules, or any other programs may be executed by the main operation unit or the like.), or a similar operation may be performed by a built-in type system using a microcomputer or the like. All components illustrated in the following embodiment need not be included in the unmanned aerial vehicle and the flight control mechanism for the unmanned aerial vehicle according to the present invention (For example, the unmanned aerial vehicle and the flight control mechanism for the unmanned aerial vehicle need not include a thrust generation propeller 25 when propulsion of the unmanned aerial vehicle is controlled under control of rotors 13 to 16 illustrated in FIG. 1B and need not include an autonomous control program and various types of databases if the unmanned aerial vehicle is completely flown under control from outside without performing autonomous control.), and the method according to the present invention need not include all method steps as illustrated. A rotary wing for floating the unmanned aerial vehicle is not limited to four rotors 13 to 16 as illustrated in FIG. 1B, for example, but may be any number of (four or more) rotary wings. A propeller for generating a thrust is not limited to the thrust generation propeller 25 illustrated in FIG. 1D, for example, but may be any propeller. The flight control mechanism for the unmanned aerial vehicle according to the present invention can be used for controlling any unmanned aerial vehicle such as a rotorcraft or a fixed-wing craft, and the unmanned aerial vehicle according to the present invention is not limited to the rotorcraft. An vehicle body size of the unmanned aerial vehicle is also arbitrary. Although an example in which the unmanned aerial vehicle performs shooting flight (flight while taking pictures) in a closed-type space is illustrated in the following embodiment, the unmanned aerial vehicle according to the present invention can be flown in not only the closed state but also any environment and for any purpose, and the flight control mechanism can be used in not only the closed-type space but also any environment. Note that the closed-type space need not be completely closed, but may be a space that is at least partially closed and where flight of the unmanned aerial vehicle is at least partially restricted. For example, a tubular space in a sewage pipeline connected to the outside via a manhole is also a closed-type space, and a tunnel of a highway is also a closed-type space, as described in the following embodiment. The number of preceding collision members to be held by the holding member is not limited to two, but is also arbitrary, and the number of flight control mechanisms to be attached to the vehicle body is also arbitrary. Note that although the holding member can be formed of a metal or plastic, for example, the holding member may be formed of any material such as an elastic body if it can exhibit a function as the holding member. Other members and components may be composed of any material if they can exhibit functions of the present invention.

Configuration of Unmanned Aerial Vehicle

Figure 1B:
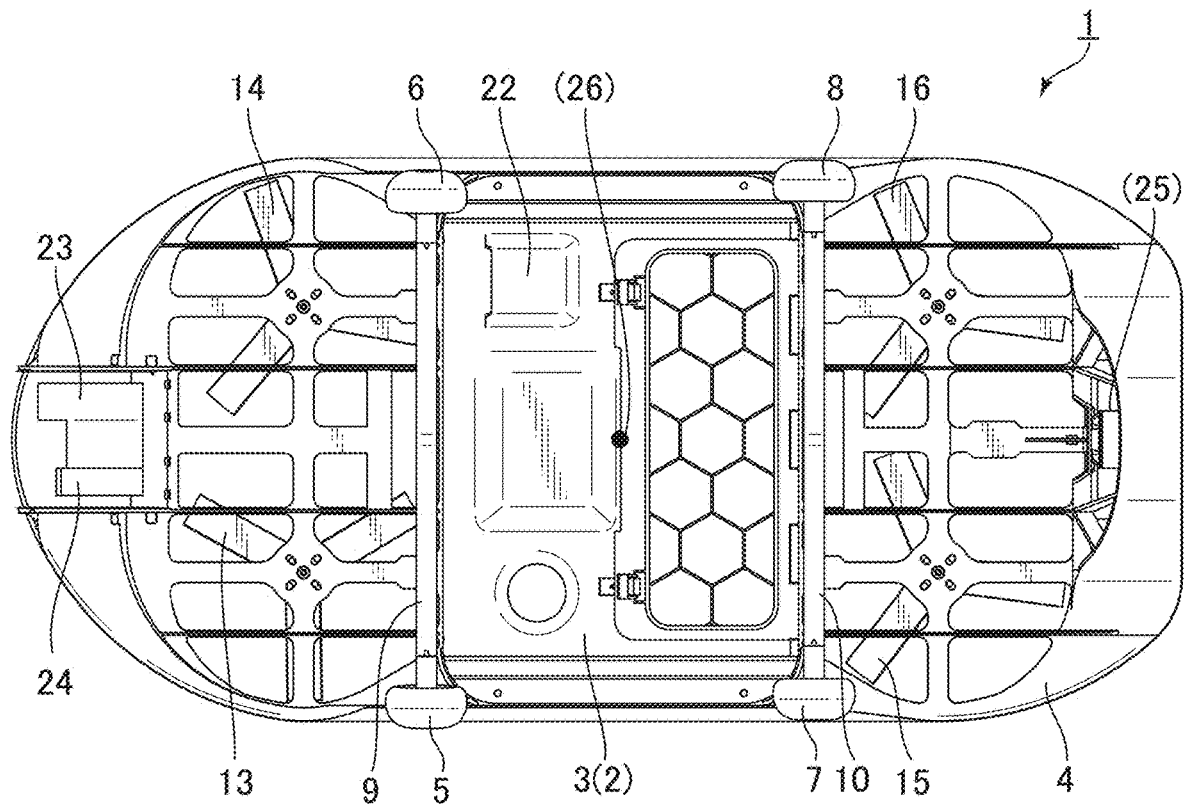
FIG. 1B is a diagram of the unmanned aerial vehicle illustrated in FIG. 1A in a positive direction of z.
Figure 1C:
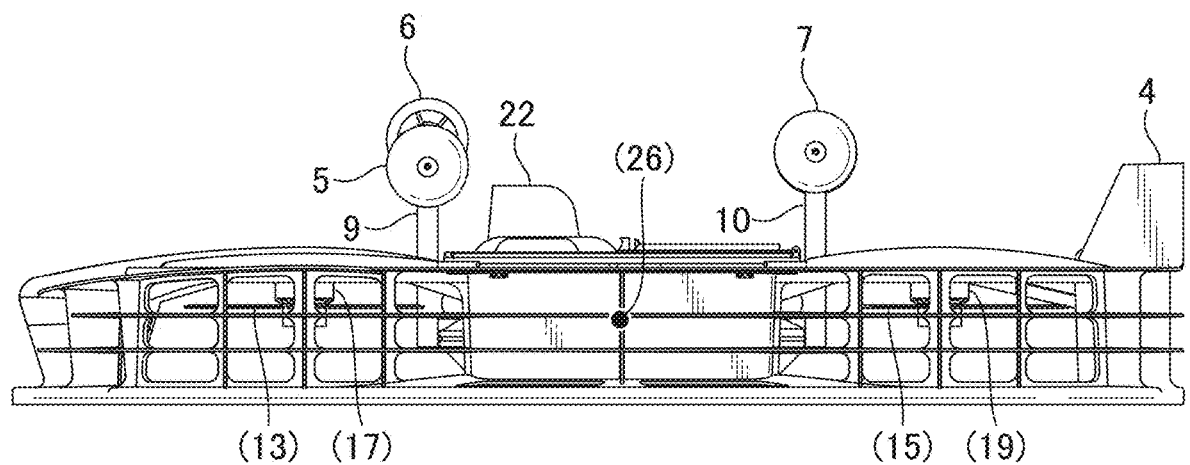
FIG. 1C is a diagram of the unmanned aerial vehicle illustrated in FIG. 1A in a positive direction of y.
Figure 1D:
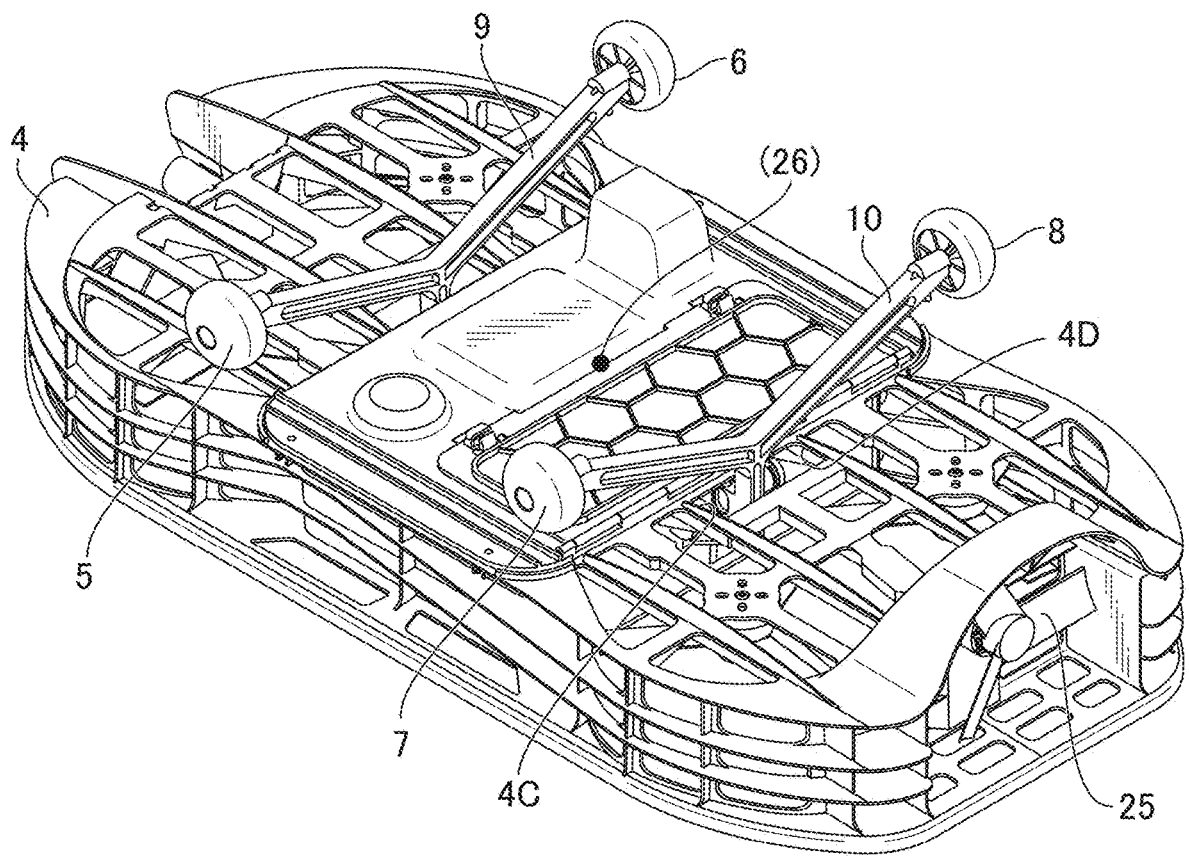
FIG. 1D is a perspective view of the unmanned aerial vehicle illustrated in FIG. 1A from behind in a traveling direction.
Figure 1E:
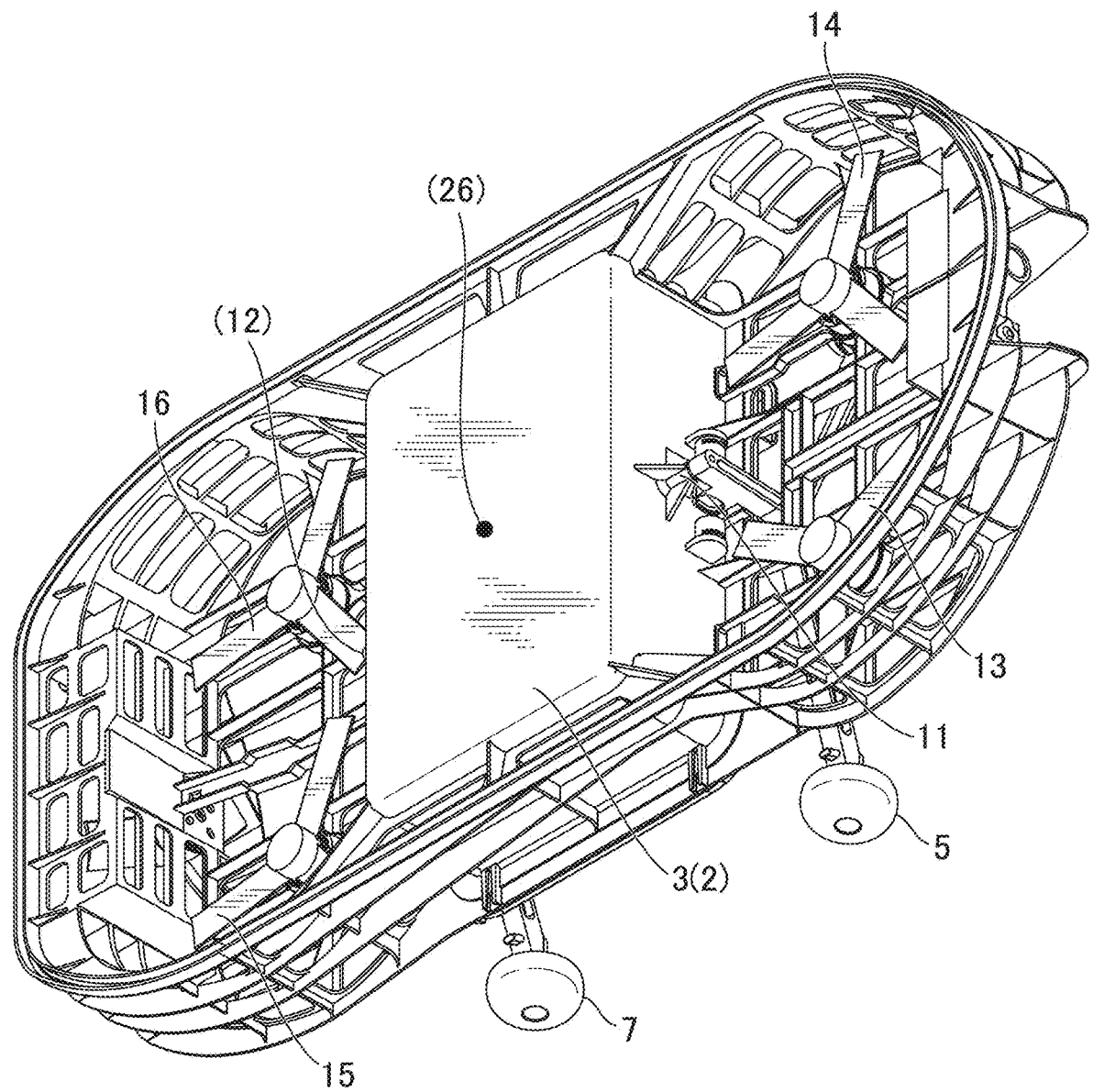
FIG. 1E is a perspective view of the unmanned aerial vehicle illustrated in FIG. 1A in a negative direction of z.
Figure 1F:
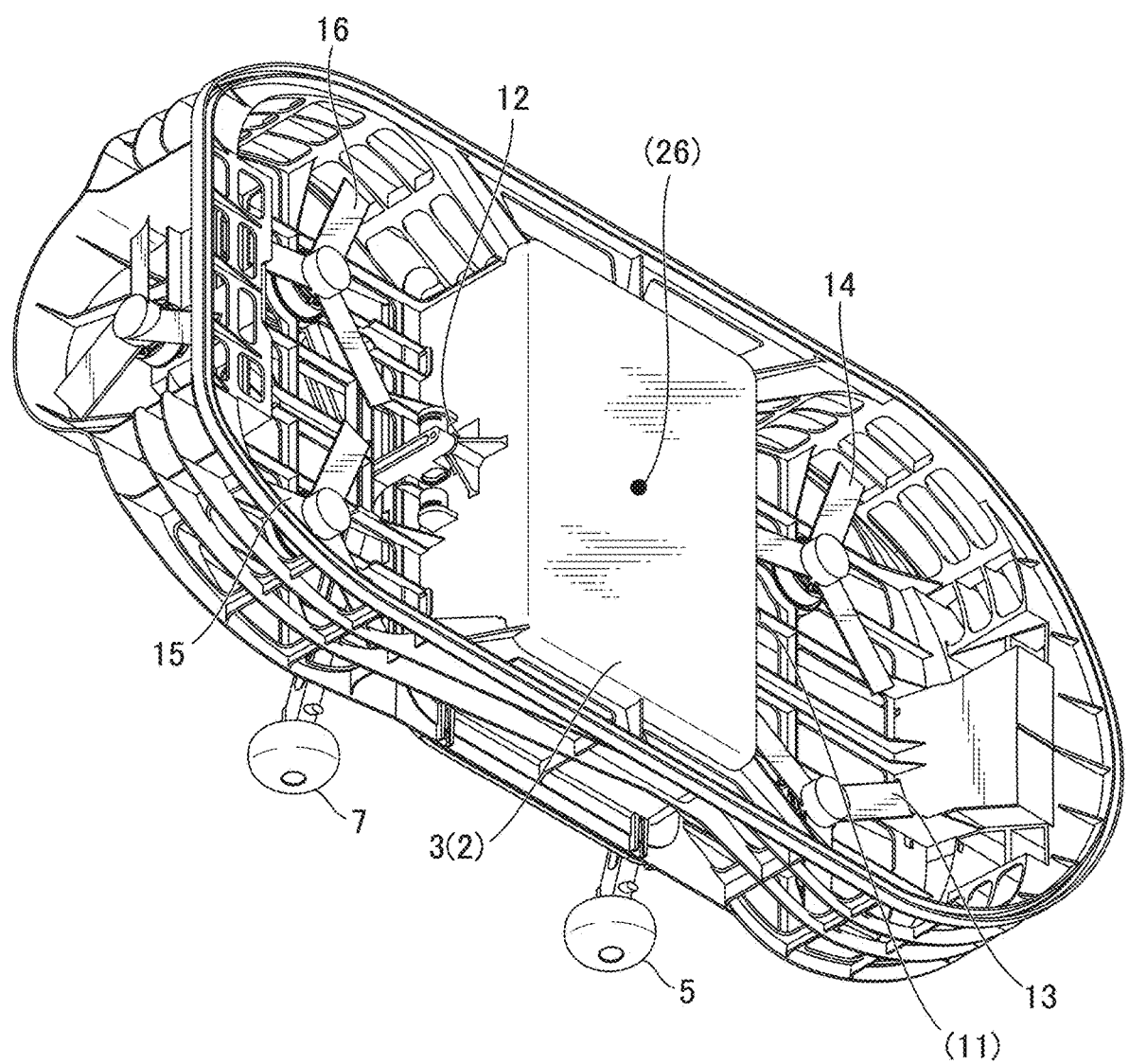
FIG. 1F is a perspective view of the unmanned aerial vehicle illustrated in FIG. 1A in the negative direction of z and in a direction different from that in FIG. 1E.

FIGS. 1A to 1F illustrate an appearance of an unmanned aerial vehicle according to an embodiment of the present invention. FIG. 1A is a perspective view, FIG. 1B is a diagram viewed in a positive direction of z illustrated in FIG. 1A, FIG. 1C is a diagram viewed in a positive direction of y, FIG. 1D is a perspective view viewed from behind in a traveling direction, and FIGS. 1E and 1F are perspective views viewed in a negative direction of z (but in different directions) illustrated in FIG. 1A. An unmanned aerial vehicle 1 is designed in dimensions of an overall width (a width in a y-direction in FIG. 1A) of approximately 250 mm and an overall length (a width in an x-direction in FIG. 1A) of approximately 550 mm to be able to fly in a closed-type space having a bore diameter of approximately 400 mm in an example, and includes a main body section 2 (housed in a waterproof case 3), five motors 17 to 21 (see FIG. 9) that are driven in response to a control signal from the main body section 2, four rotors (rotary wings) 13 to 16 that respectively rotate by drives of the motors 17 to 20 to float the unmanned aerial vehicle 1 (The adjacent rotors respectively rotate in opposite directions, for example, the rotors 13 and 16 rotate in a clockwise direction viewed in the positive direction of z, and the rotors 14 and 15 rotate in a counterclockwise direction viewed in the positive direction of z.), a thrust generation propeller 25 that rotates by a drive of the motor 21 to generate a thrust of the unmanned aerial vehicle 1, an inspection camera 22, a front camera 23, and a ultrasonic sensor 24, and each of the components are integrated using a frame 4.

The unmanned aerial vehicle 1 further includes a holding member 9 that separates preceding collision members (a rotary member such as a wheel or a roller) 5 and 6 to hold the preceding collision members 5 and 6 above an vehicle body of the unmanned aerial vehicle 1 (the positive direction of the z-axis) and can be inclined with respect to the vehicle body by rotating toward the lateral side of the vehicle body around a predetermined position in the vehicle body or on the vehicle body (in the positive direction of y or in a negative direction of y, which need not be completely parallel to the y-direction but may intersect the x-direction) and a holding member 10 that similarly holds preceding collision members (a rotary member such as a wheel or a roller) 7 and 8 and can be similarly inclined with respect to the vehicle body with the holding member 9 and the holding member 10 separated from each other in a front-rear direction (A positive direction of x in FIG. 1A is a forward direction, and the positive direction of y and the negative direction of y in FIG. 1A are respectively a leftward direction and a rightward direction.). The holding member 9 is attached to the waterproof case 3 by a holding member attachment member 11 (FIG. 1E), as illustrated in FIG. 1E, and the holding member 10 is also similarly attached to the waterproof case 3 by a holding member attachment member 12 (FIG. 1F). Note that the number of holding members to be attached to the vehicle body is arbitrary. For example, one of the holding members 9 and 10 may be detached, only one holding member may be used by being attached to the vicinity of a center of gravity 26 of the vehicle body, or three or more holding members may be used by being attached. Note that in the present embodiment, the components of the unmanned aerial vehicle 1 illustrated in FIG. 1A, excluding the holding members 9 and 10 and the preceding collision members 5 to 8 held thereby or excluding shaft sections for preceding collision member 5A to 8A and preceding collision member attachment members 9B-1, 9B-2, 10B-1, and 10B-2 when the preceding collision members 5 to 8, are each a rotary member such as a wheel or a roller are referred to as an "vehicle body".

Figure 2:
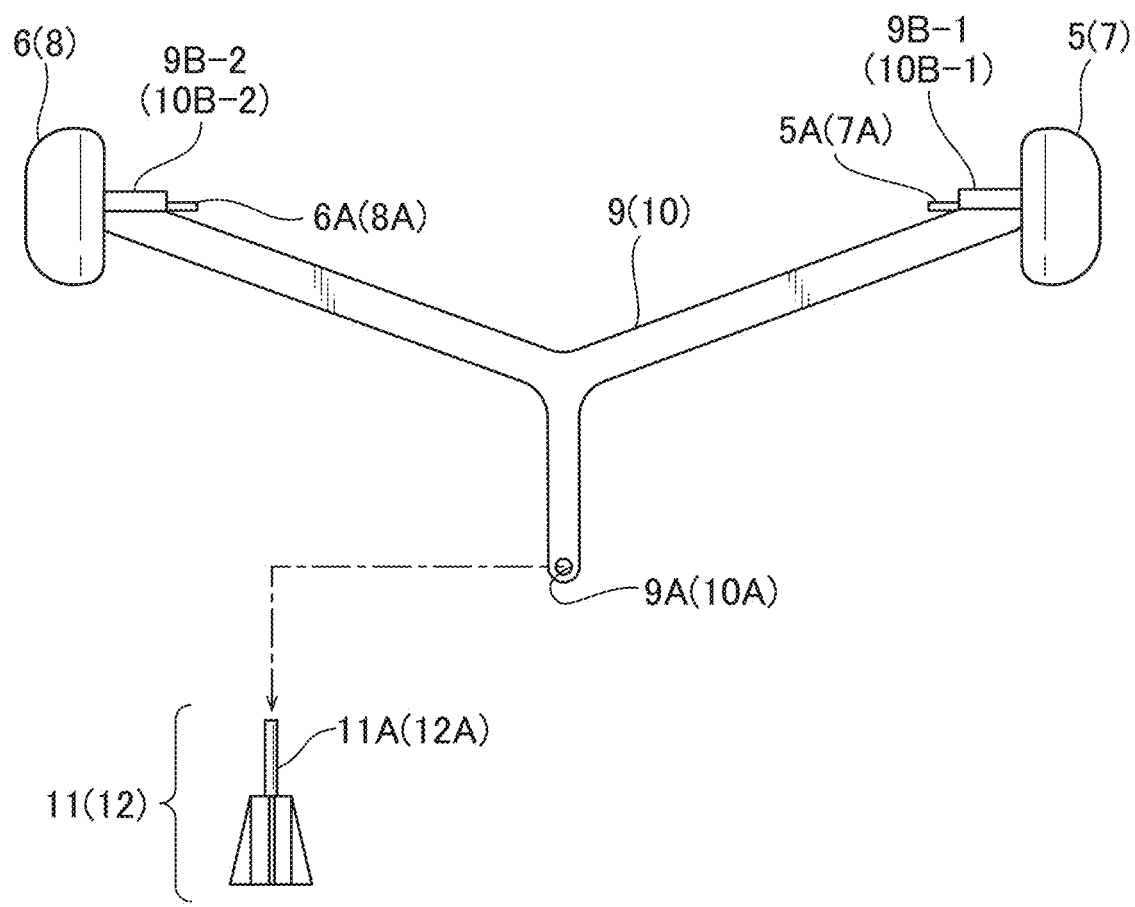
FIG. 2 is a diagram illustrating a holding member that holds preceding collision members (a rotary member such as a wheel or a roller) and a holding member attachment member to which the holding member is attached.

FIG. 2 illustrates the holding member 9 that holds the preceding collision members 5 and 6 and the holding member attachment member 11 to which the holding member 9 is attached. The same may apply to a configuration of the holding member 10 that holds the preceding collision members 7 and 8 and the holding member attachment member 12 to which the holding member 10 is attached. As illustrated in FIGS. 1E and 1F, the holding member attachment members 11 and 12 are fixed to the waterproof case 3. The holding member 9 is provided with a hole 9A. When a shaft section for holding member 11A in the holding member attachment member 11 is inserted into the hole 9A (See FIG. 1E. Although the shaft section for holding member 11A extends along the paper in FIG. 2, the shaft section for holding member 11A is inserted into the hole 9A with the shaft section 11A extending in a direction perpendicular to the paper.), the holding member 9 is attached to the vehicle body. The holding member 9 can be inclined with respect to the vehicle body by rotating toward the lateral side of the vehicle body around a position of the hole 9A with the shaft section for holding member 11A used as a rotation axis (fixing axis). To prevent the holding member 9 from separating from the holding member attachment member 11, a member for separation prevention (a cap, etc.) may be further fitted in the shaft section for holding member 11A after the holding member 9 is attached. Note that "rotation" herein is not limited to rotation in one direction but may be rotation in both directions (in positive and negative directions in the y-direction in FIG. 1A in an example) or may not be complete rotation by 360 degrees (The same applies to subsequent "rotation".). As illustrated in FIG. 1E, although the holding member 9 is exposed to the top of the vehicle body (in the positive direction of z) from a hole provided in the frame 4 as illustrated in FIG. 1A while being attached to the waterproof case 3 by the holding member attachment member 11, rotational motion of the holding member 9 is prevented at a boundary position (rotation stop positions 4A and 4B) on the lateral side of the hole. Thus, the rotational motion is limited to rotation up to a predetermined maximum angle. The holding member 10 is also similarly exposed to the top of the vehicle body (in the positive direction of z) from a hole provided in the frame 4 while being attached to the waterproof case 3 by the holding member attachment member 12, and rotational motion of the holding member 10 is prevented at a boundary position (rotation stop positions 4C and 4D (see FIG. 1D)) on the lateral side of the hole. Thus, the rotational motion of the holding member 10 is also limited to rotation up to a predetermined maximum angle (The respective maximum rotational angles of the holding members 9 and 10 may differ from each other.).

Figure 3A:
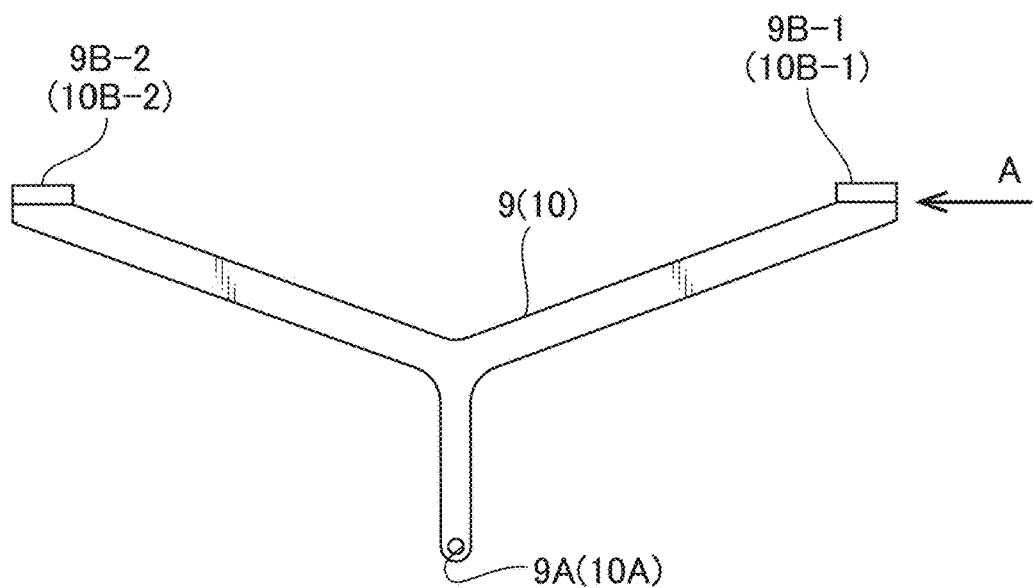
FIG. 3A is a diagram illustrating the holding member with the preceding collision members removed.
Figure 3B:
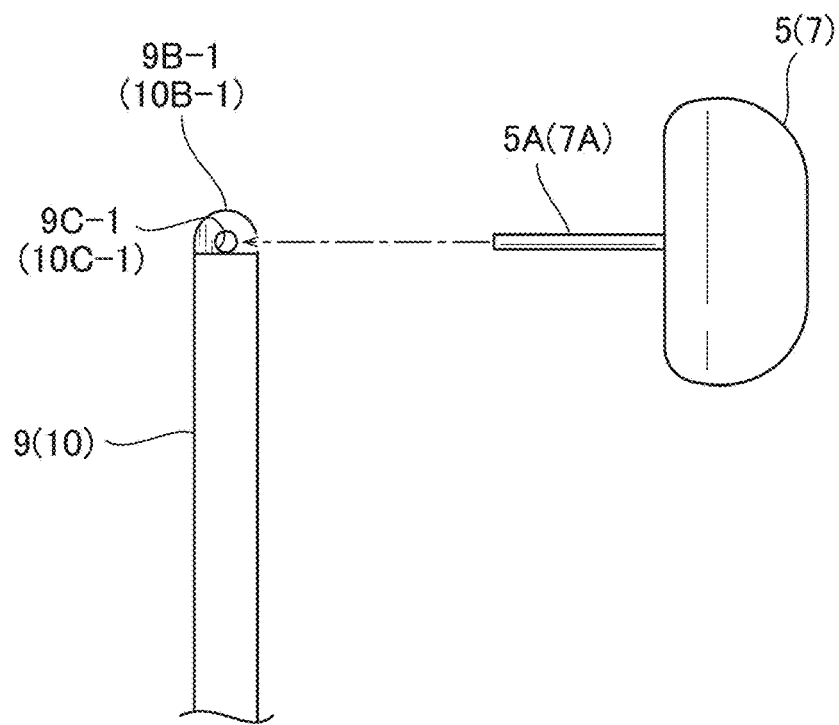
FIG. 3B is a diagram illustrating the holding member, the preceding collision member (a rotary member such as a wheel or a roller) to be attached to the holding member, and a shaft section for preceding collision member as viewed in an arrow direction indicated by A in FIG. 3A.

The holding member 9 with the preceding collision members 5 and 6 removed is illustrated in FIG. 3A. The same may apply to the holding member 10 with the preceding collision members 7 and 8 removed. The holding member 9 is provided with preceding collision member attachment members 9B-1 and 9B-2. The holding member 9, the preceding collision member 5 to be attached to the holding member 9, and the shaft section for preceding collision member 5A as viewed in an arrow direction indicated by A in FIG. 3A are illustrated in FIG. 311. Here, the preceding collision member 5 as a rotary member such as a wheel or a roller is fixed to the shaft section for preceding collision member 5A, and the shaft section for preceding collision member 5A is inserted into a hole 9C-1 provided in the preceding collision member attachment member 9B-1 in the holding member 9 (It may be passed through the hole 9C-1, as illustrated in FIG. 2. The same applies to insertion of the shaft section for holding member 11A into the above-described hole 9A.) (although the shaft section for preceding collision member 5A extends along the paper in FIG. 3B, the shaft section for preceding collision member 5A is inserted into the hole 9C-1 with the shaft section 5A extending in the direction perpendicular to the paper.) so that the shaft section 5A is held in the holding member 9. Note that "holding" herein does not require that the preceding collision member 5 is completely fixed to the holding member 9 but may prevent the preceding collision member 5 from completely separating from the holing member 9 and freely moving (The same applies to the other holding member and the other preceding collision members.). In a configuration illustrated in FIG. 3B, the preceding collision member (rotary member) 5 and the shaft section for preceding collision member 5A can rotate in an integrated manner with the shaft section for preceding collision member 5A held in the holding member 9 using the shaft section for preceding collision member 5A as a rotation axis. To prevent the preceding collision member 5 from separating from the holding member 9, a member for separation prevention (a cap, etc.) may be further fitted in the shaft section for preceding collision member 5A after the preceding collision member 5 is attached to the holding member 9 as described above. The same may apply to a mode in which the holding member 9 holds the preceding collision member 6 and a mode in which the holding member 10 holds the preceding collision members 7 and 8.

Figure 4:
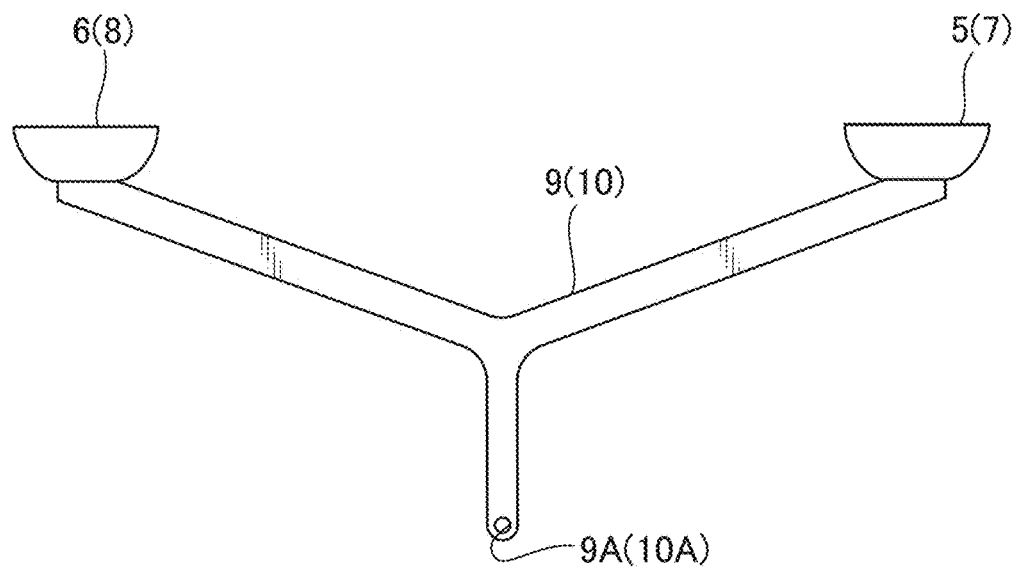
FIG. 4 is a diagram illustrating the holding member to which the preceding collision members other than a rotary member such as a wheel or a roller is attached.

Note that a member other than a rotary member such as a wheel or a roller may be used as the preceding collision members 5 to 8. An example in which a preceding collision member fixed to a holding member is used is illustrated in FIG. 4 as an example. In FIG. 4, the preceding collision members 5 and 6 are each configured as a member fixed to the holding member 9, and are each formed of a low friction plastic material or the like. Even if the preceding collision member and the holding member each having such a configuration are used, flight control of an unmanned aerial vehicle as described below can be performed. Note that the preceding collision member advances while sliding on a boundary surface (like, e.g., a sled), unlike when a rotary member such as a wheel or a roller is used. Thus, the preceding collision member is preferably formed of a material having a low friction between itself and the boundary surface. The same may apply in a mode in which the holding member 10 holds the preceding collision members 7 and 8. When the preceding collision members 5 to 8 wear out by advancing while sliding in contact with the boundary surface, the preceding collision members 5 to 8 are preferably replaced with new ones.

The inspection camera 22 is a camera for shooting a still image or a moving image during flight in a closed-type space by the unmanned aerial vehicle 1. In an example of the inspection camera 22, a commercially available camera such as a GoPro session (Tajima MOTOR CORPORATION) can be used. The front camera 23 is a camera for shooting a still image or a moving image in a traveling direction during flight in the closed-type space by the unmanned aerial vehicle 1. Data of the shot still image or moving image is transmitted to an external apparatus (e.g., a computer including a display), as needed, and an operator can steer the unmanned aerial vehicle 1 while confirming the data. The ultrasonic sensor 24 is a sensor for detecting an obstacle or the like ahead thereof, and can transmit a ultrasonic wave in the traveling direction during flight in the closed-type space by the unmanned aerial vehicle 1 and measure a distance from the obstacle or the like by receiving a reflected wave. The inspection camera 22 and the front camera 23 may be each a camera such as an infrared camera or a ultraviolet camera.

The above-described rotation center position in each of the holding members 9 and 10 is preferably below (in the negative direction of z in FIG. 1A) a position of the set of rotors corresponding to the holding member with the vehicle body not inclined. A reason for that will be described below with reference to FIGS. 5A to 5E. Note that although description is made hereinafter using a model in which the rotation center position of the holding member 9 (10) and the rotation center position of the rotors 13 (15) and 14 (16) are coplanar (a yz plane in FIG. 1A) (respective x coordinates illustrated in FIG. 1A are equal to each other) for the purpose of simplifying the description (The same applies in a comparative example illustrated in FIGS. 6A to 6E.), an operation can be basically described in a similar principle otherwise.

Figure 5A:
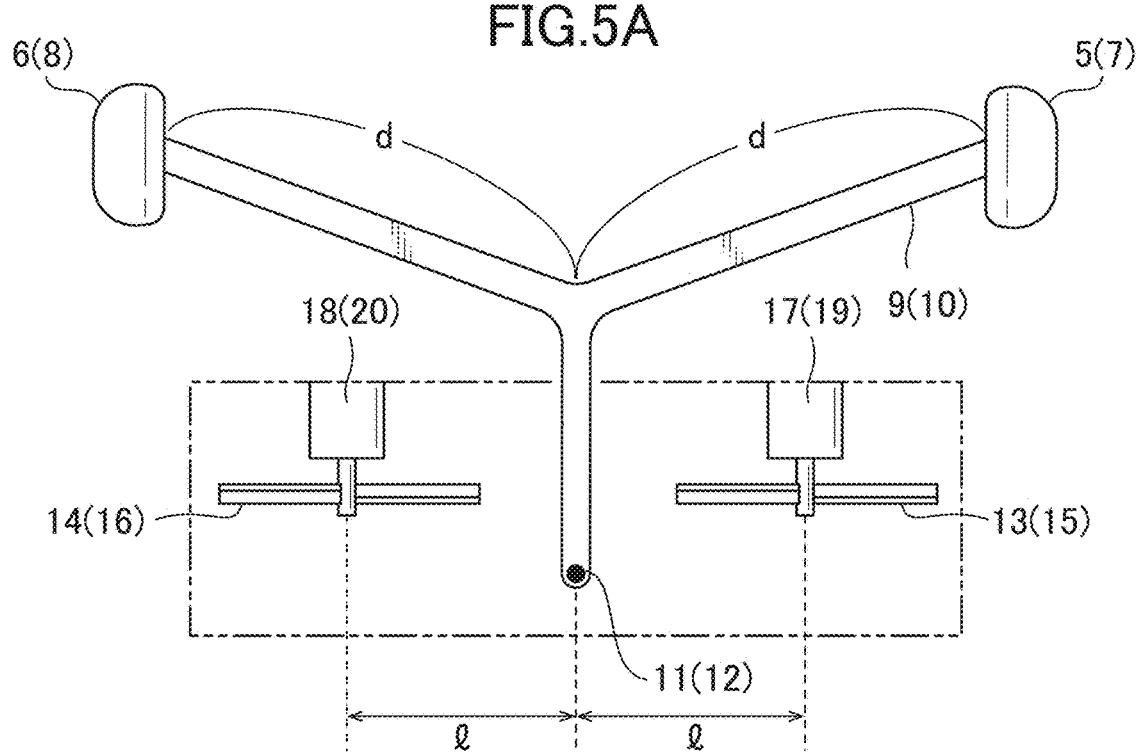
FIG. 5A is a diagram illustrating a positional relationship when a holding member is attached to an vehicle body to rotate around a position lower than a corresponding set of rotors.

A positional relationship when the holding member is attached to be rotatable around a position lower than the corresponding set of rotors (in the negative direction of z in FIG. 1A) with the vehicle body not inclined is illustrated in FIG. 5A (viewed in the positive direction of x in FIG. 1A). Although description is made below using the holding member 9 and the corresponding set of rotors 13 and 14, an operation can also be described in a similar principle in the holding member 10 and the corresponding set of rotors 15 and 16. Although it is assumed that respective distances between a center line of the holding member, which remains not inclined with respect to the vehicle body, and center lines of the two rotors in the corresponding set are equal to each other (in FIG. 5A), and respective distances from a branch portion of the holding member 9 (10) to the preceding collision members 5 (7) and 6 (8) on both sides are also equal to each other (d in FIG. 5A), the operation can be basically described in a similar principle even when the respective distances are not equal to each other.

Figure 5B:
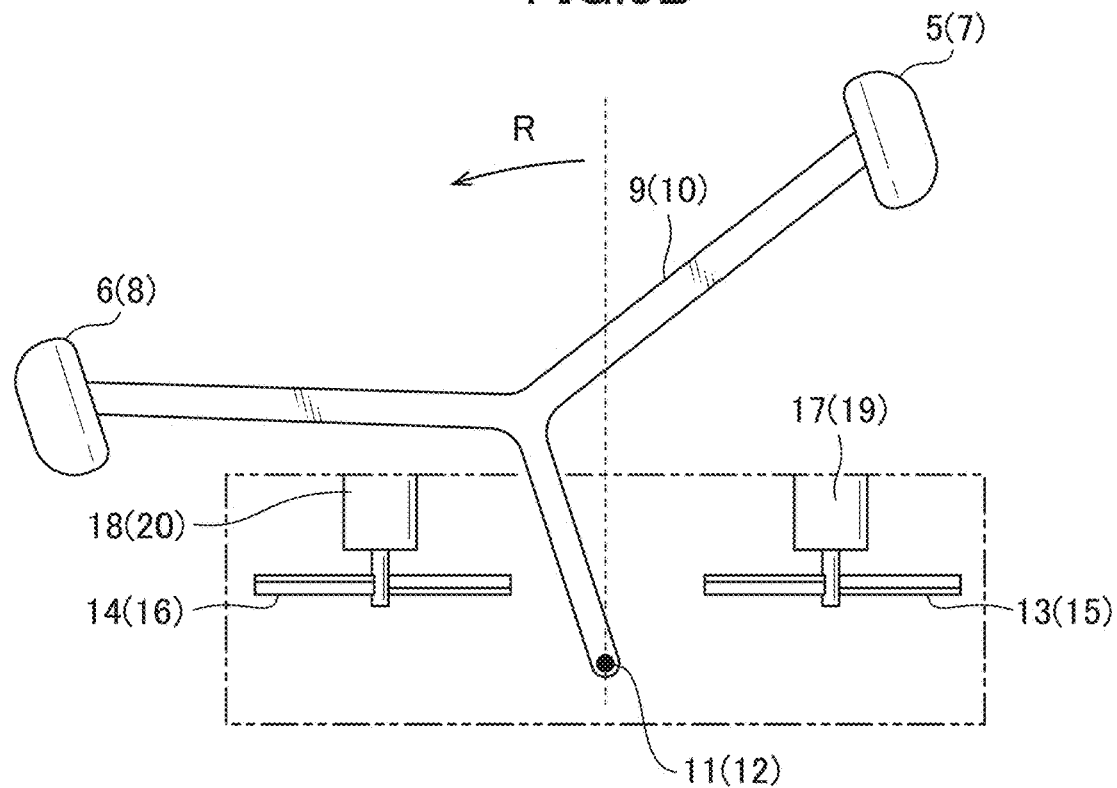
FIG. 5B is a diagram illustrating a positional relationship when the holding member illustrated in FIG. 5A is inclined with respect to the vehicle body.

As illustrated in FIG. 5B, the holding member 9 is inclined toward the lateral side of the vehicle body due to any reason. When the rotors 13 and 14 continue to rotate in this state, forces f are respectively exerted (respectively act) on the rotors 13 and 14, as indicated by arrows in FIG. 5C. Note that although an entire configuration illustrated in FIG. 5B is drawn in an inclined manner for convenience of illustration in FIG. 5C, a relative inclination between the holding member 9 and the vehicle body does not change from the configuration illustrated in FIG. 5B. Although it is assumed that the forces respectively exerted on the rotors 13 and 14 are equal to each other for simplicity, the operation can also be basically described in a similar principle even when the forces respectively exerted on the rotors 13 and 14 differ from each other due to a difference in number of rotations, for example.

Figure 5C:
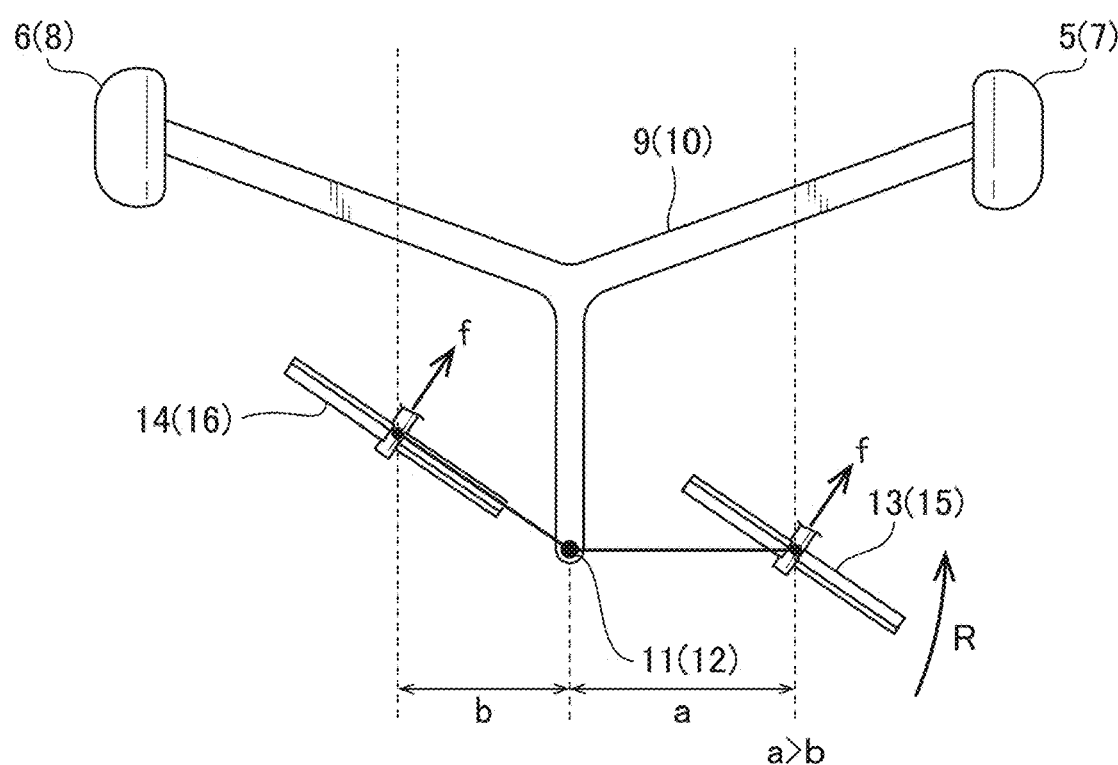
FIG. 5C is a diagram illustrating a force to be exerted on each of the rotors when the inclination illustrated in FIG. 5B has occurred during flight and a rotational direction of the vehicle body caused by the force.
Figure 5D:
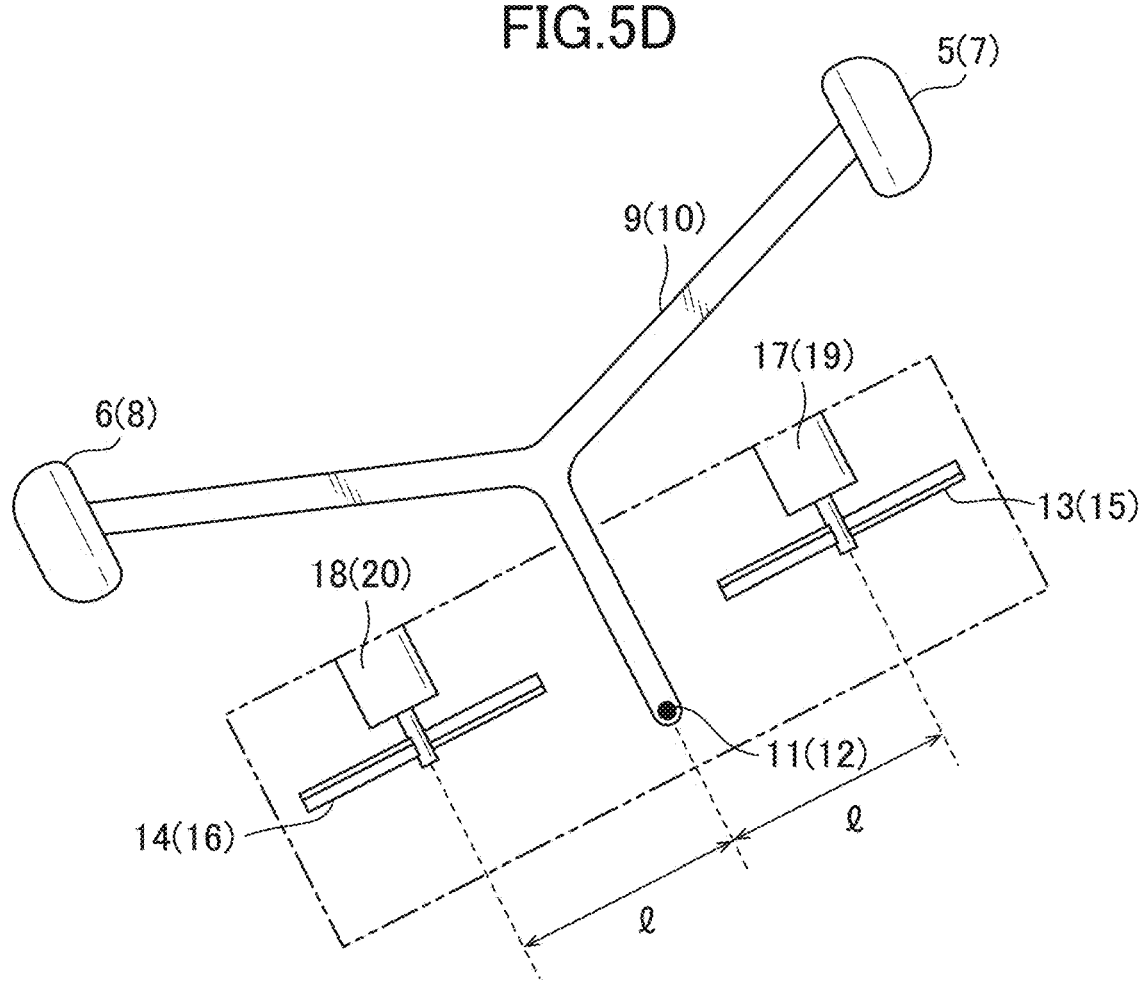
FIG. 5D is a diagram illustrating a positional relationship when the vehicle body is inclined by a function of the force to the rotor illustrated in FIG. 5C.
Figure 5E:
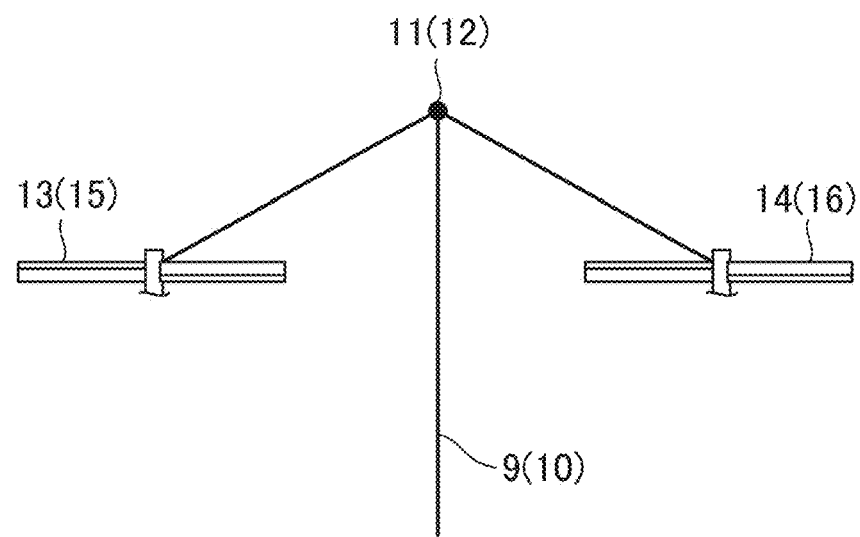
FIG. 5E is a conceptual diagram illustrating a principle of the inclination of the vehicle body described with reference to FIGS. 5A to 5D.

At this time, a "distance" between the rotor 14 and the center line of the holding member 9 (a distance in a direction perpendicular to the center line of the holding member 9 between a rotation center of the rotor 14 and the center line) is b, while a "distance" between the rotor 13 and the center line of the holding member 9 (a distance in the direction perpendicular to the center line of the holding member 9 between a rotation center of the rotor 13 and the center line) is a, and a is larger than b (It is assumed that respective magnitudes of distances and the angles from a position on the holding member attachment member 11 as a rotation center of the holding member 9 to the rotation centers of the rotors 13 and 14 are equal to each other in FIG. 5A. Even in a configuration deviating from such a configuration, an operation can be basically described in a similar principle.). Accordingly, a force (torque) to rotate the vehicle body in an arrow direction indicated by R in FIG. 5C is exerted as a whole on the vehicle body. The force is a force to be exerted in a direction in which the inclination of the holding member 9 with respect to the vehicle body is canceled. When the vehicle body is inclined in a similar direction to that of the inclination of the holding member 9, as illustrated in FIG. 5D, a relative inclination between the holding member 9 and the vehicle body can be at least partially canceled. A positional relationship between the holding member 9 and the rotors 13 and 14, including an attachment position of the holding member 9 (a position of the holding member attachment member 11), is illustrated in FIG. 5E if conceptually drawn, and a principle in which the above-described relative inclination can be at least partially canceled can be understood. In the holding member 10, when the holding member 10 is also attached to be rotatable around a position lower than a position of the corresponding set of rotors 15 and 16 (in the negative direction of z in FIG. 1A), a relative inclination between the holding member 10 and the vehicle body can also be at least partially canceled in a similar principle.

Figure 6A:
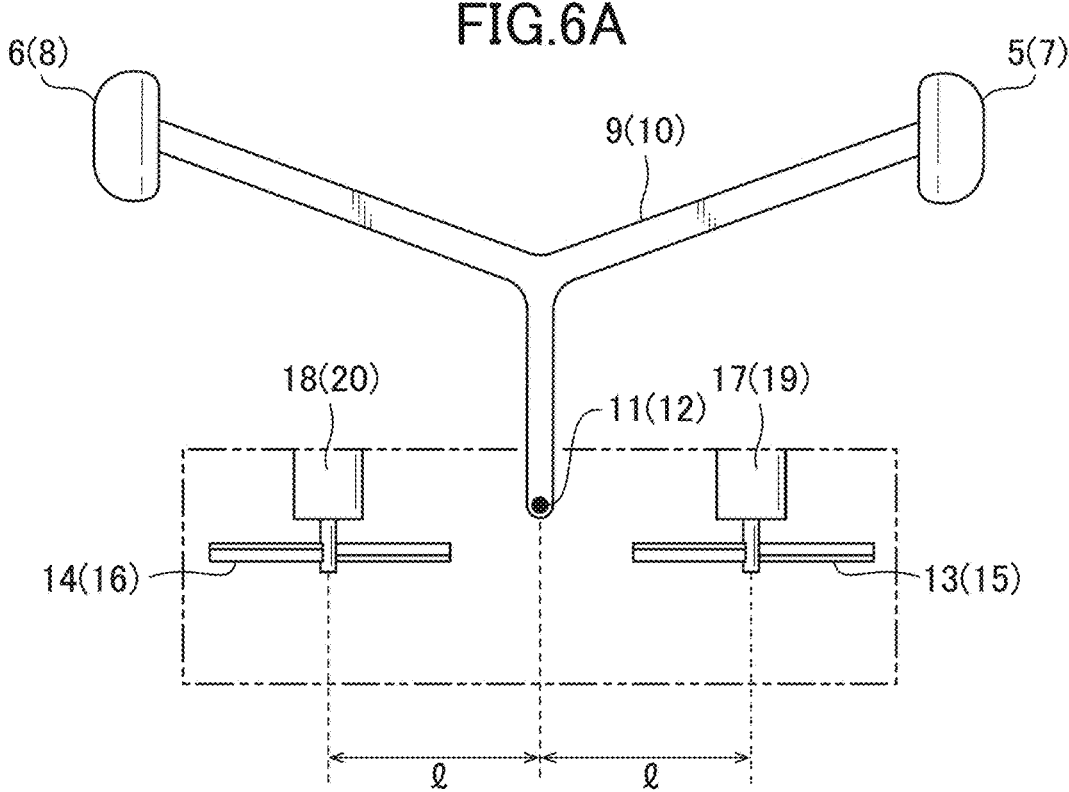
FIG. 6A is a diagram illustrating a positional relationship when a holding member is attached to an vehicle body to rotate around a position higher than a corresponding set of rotors.

Then, as a comparative example, a positional relationship when a holding member is attached to be rotatable around a position higher than a corresponding set of rotors with an vehicle body not inclined (in the positive direction of z in FIG. 1A) is illustrated in FIG. 6A (viewed in the positive direction of x in FIG. 1A). Although description is made below using a holding member 9 and a corresponding set of rotors 13 and 14, an operation can also be described in a similar principle in a holding member 10 and a corresponding set of rotors 15 and 16. Although it is assumed that respective distances between a center line of the holding member and center lines of the two rotors in the corresponding set with the vehicle body not inclined are equal to each other (l in FIG. 6A), the operation can be basically described in a similar principle even when the distances are not equal to each other.

Figure 6B:
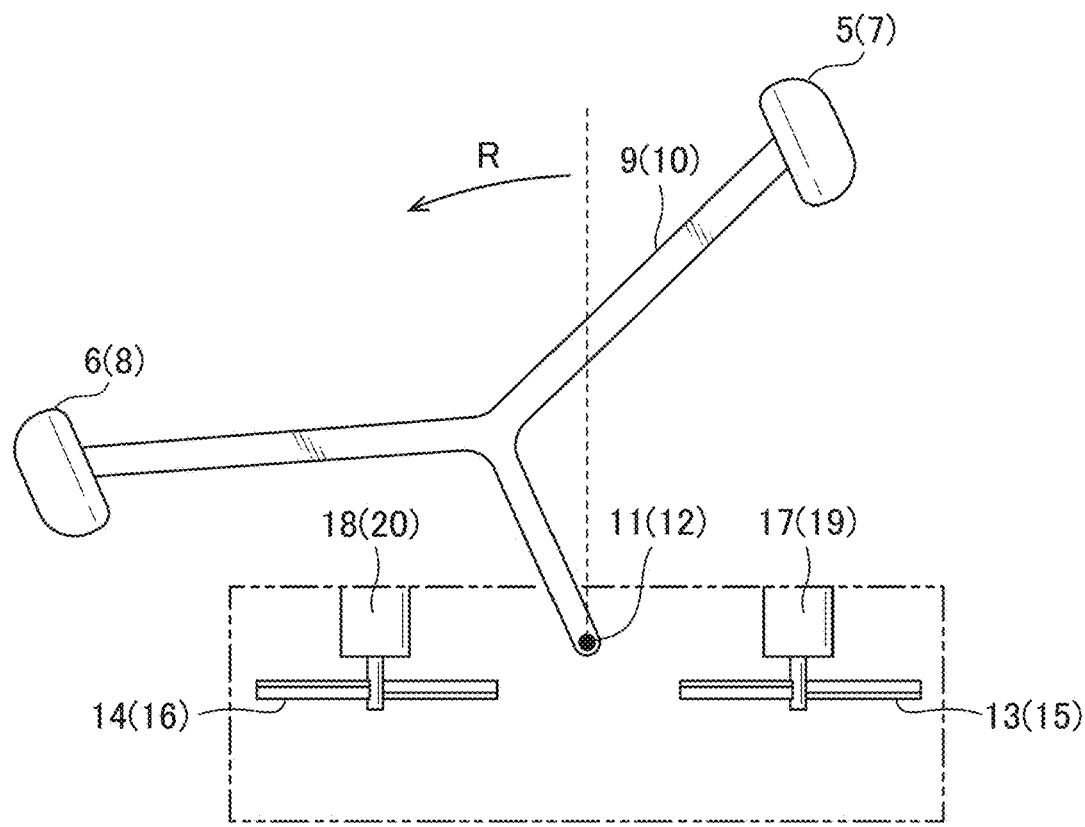
FIG. 6B is a diagram illustrating a positional relationship when the holding member illustrated in FIG. 6A is inclined with respect to the vehicle body.

As illustrated in FIG. 6B, it is assumed that the holding member 9 is inclined toward the lateral side of the vehicle body due to any reason. When the rotors 13 and 14 continue to rotate in this state, forces f are respectively exerted (respectively act) on the rotors 13 and 14, as indicated by an arrow in FIG. 6C. Note that although an entire configuration illustrated in FIG. 6B is drawn in an inclined manner for convenience of illustration in FIG. 6C, a relative inclination between the holding member 9 and the vehicle body does not change from the configuration illustrated in FIG. 6B. Although it is assumed that the forces respectively exerted on the rotors 13 and 14 are equal to each other for simplicity, an operation can be basically described in a similar principle even when the forces respectively exerted on the rotors 13 and 14 differ from each other due to a difference in number of rotations, for example.

Figure 6C:
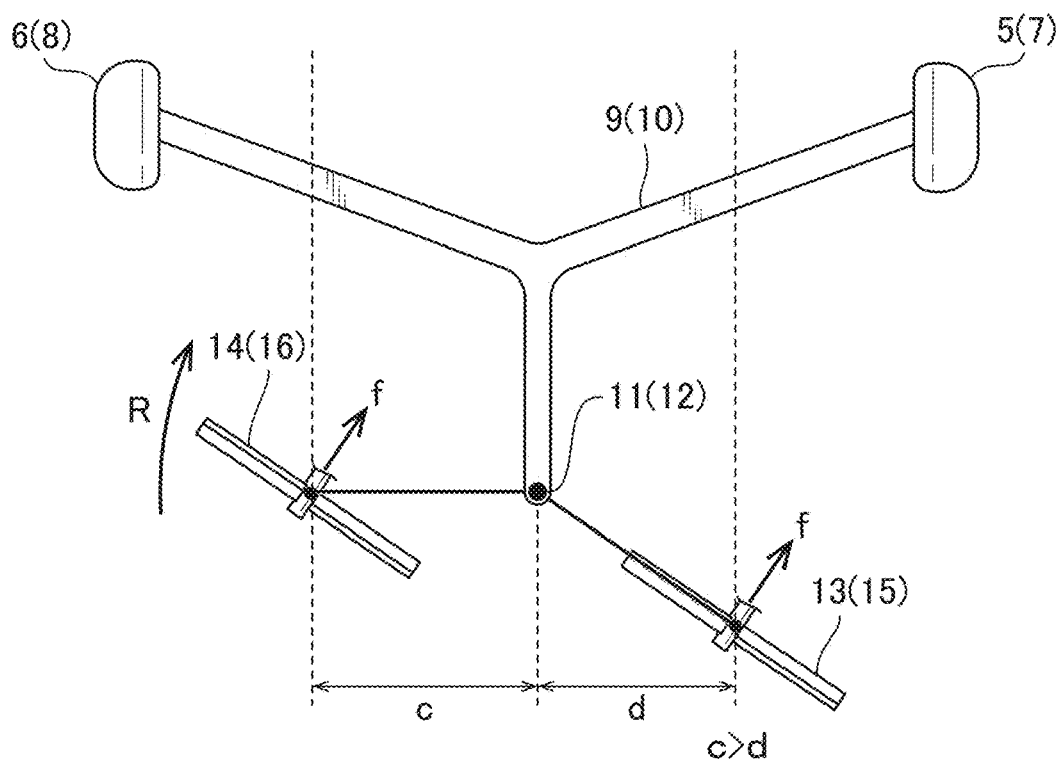
FIG. 6C is a diagram illustrating a force to be exerted on each of the rotors when the inclination illustrated in FIG. 6B has occurred during flight and a rotational direction of the vehicle body caused by the force.
Figure 6D:
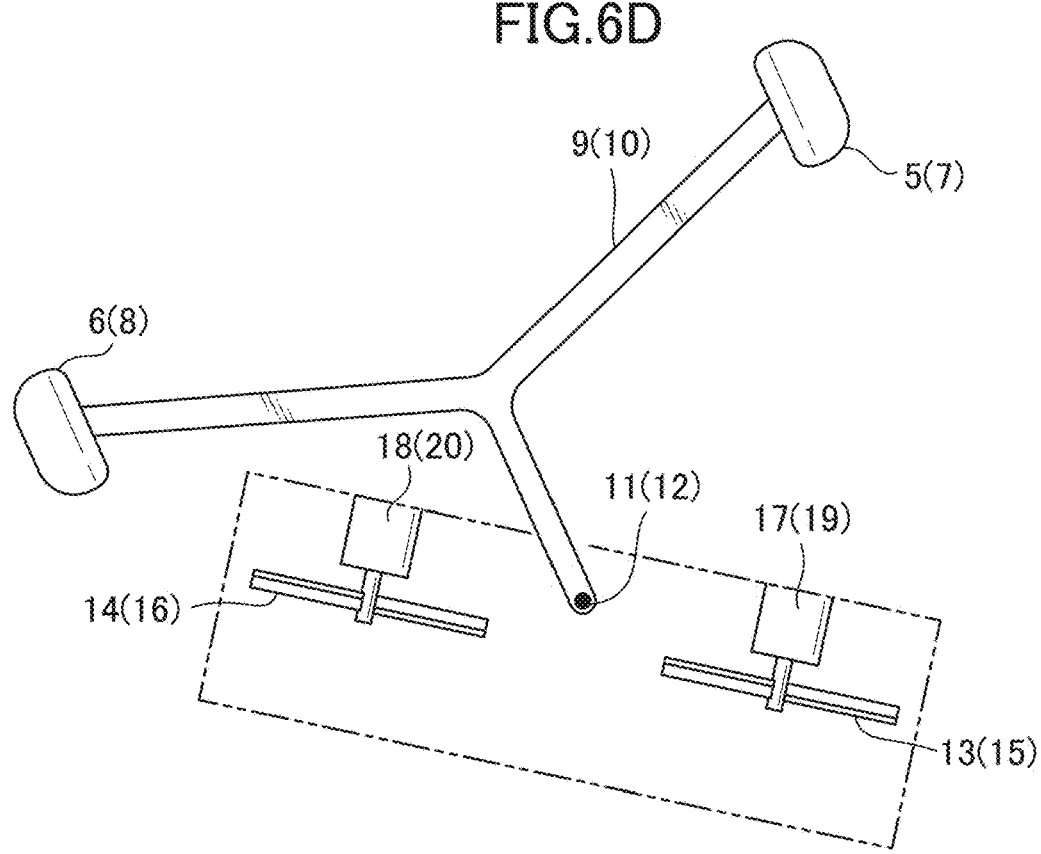
FIG. 6D is a diagram illustrating a positional relationship when the vehicle body is inclined by the function of the force to the rotor illustrated in FIG. 6C.
Figure 6E:
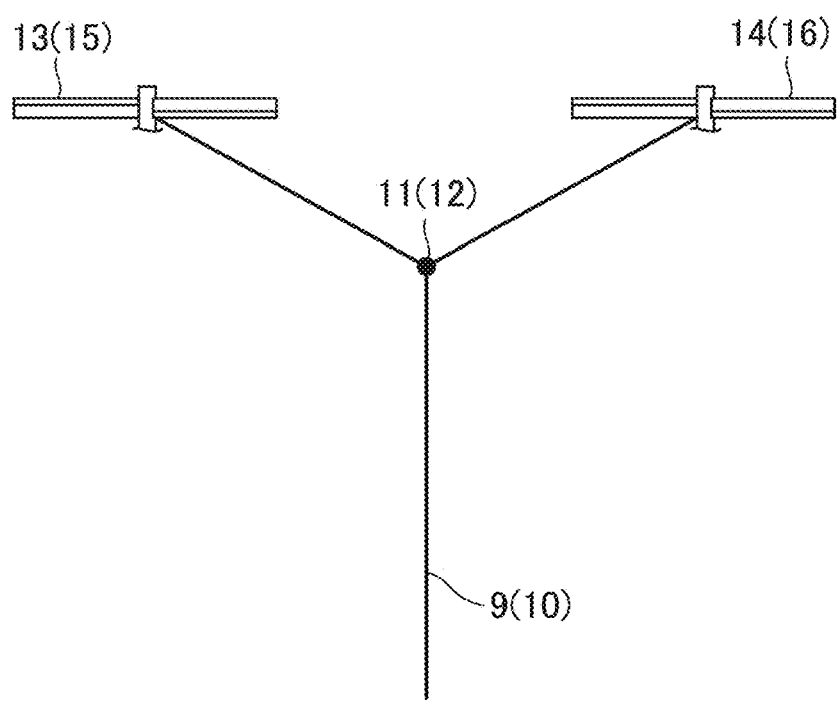
FIG. 6E is a conceptual diagram illustrating a principle of the inclination of the vehicle body described with reference to FIGS. 6A to 6D.

At this time, although a "distance" between the rotor 14 and a center line of the holding member 9 (a distance in a direction perpendicular to the center line of the holding member 9 between a rotation center of the rotor 14 and the center line) is c, while a "distance" between the rotor 13 and the center line of the holding member 9 (a distance in the direction perpendicular to the center line of the holding member 9 between a rotation center of the rotor 13 and the center line) is d, and c is larger than d (It is assumed that respective magnitudes of distances and angles from a position on a holding member attachment member 11 as a rotation center of the holding member 9 to the rotation centers of the rotors 13 and 14 are equal to each other in FIG. 6A. In a configuration deviating from such a configuration, the operation can also be basically described in a similar principle.). Accordingly, a force (torque) to rotate the vehicle body in an arrow direction indicated by R in FIG. 6C is exerted as a whole on the vehicle body. The force is a force to be exerted in a direction in which inclination of the holding member 9 with respect to the vehicle body is increased. When the vehicle body is inclined in a direction opposite to the direction of the inclination of the holding member 9, as illustrated in FIG. 6D, a relative inclination between the holding member 9 and the vehicle body increases. A positional relationship between the holding member 9 and the rotors 13 and 14, including an attachment position of the holding member 9 (a position of the holding member attachment member 11), is illustrated in FIG. 6E if conceptually drawn, and a principle in which the above-described relative inclination increases can be understood. In the holding member 10, when the holding member 10 is also attached to be rotatable around a position higher than a position of the corresponding set of rotors 15 and 16 (in the positive direction of z in FIG. 1A), a relative inclination between the holding member 10 and the vehicle body increases in a similar principle. Although a configuration corresponding to FIG. 5A is preferably adopted to cancel the relative inclination, it should be noted that the present invention can be implemented even if a configuration corresponding to FIG. 6A is adopted.

Figure 7A:
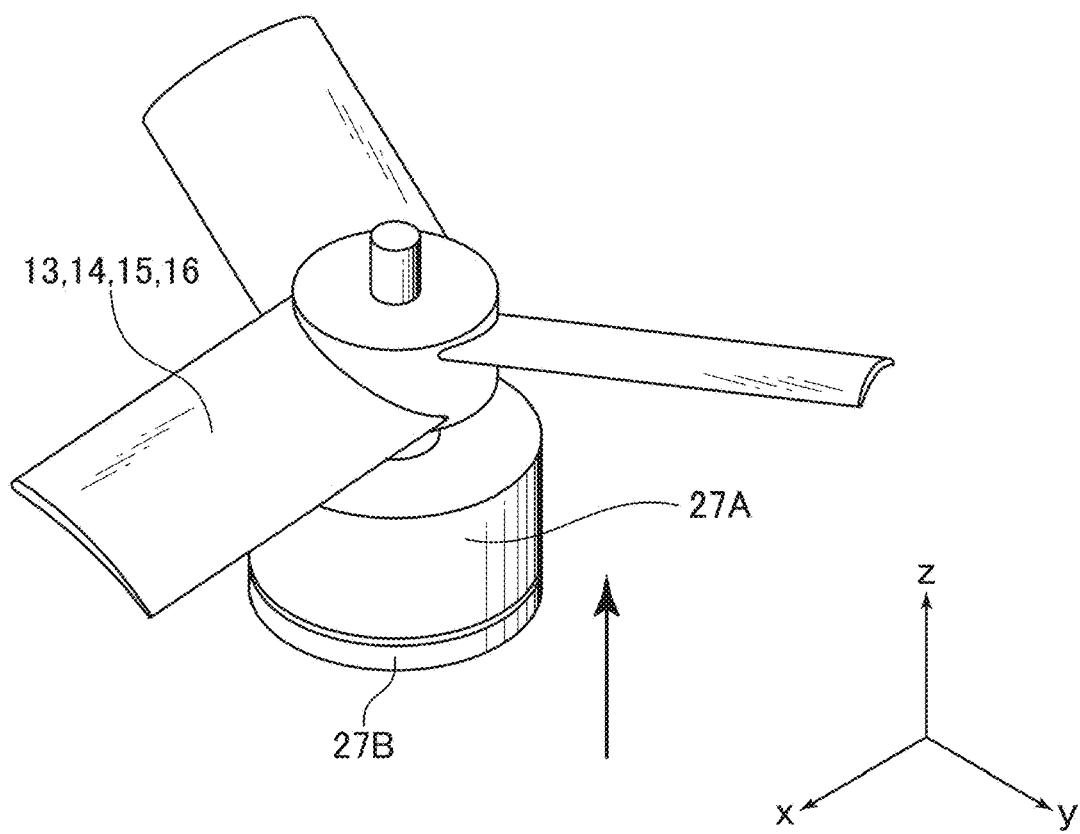
FIG. 7A is a perspective view illustrating a positional relationship between rotors and motor members in a comparative example.
Figure 7B:
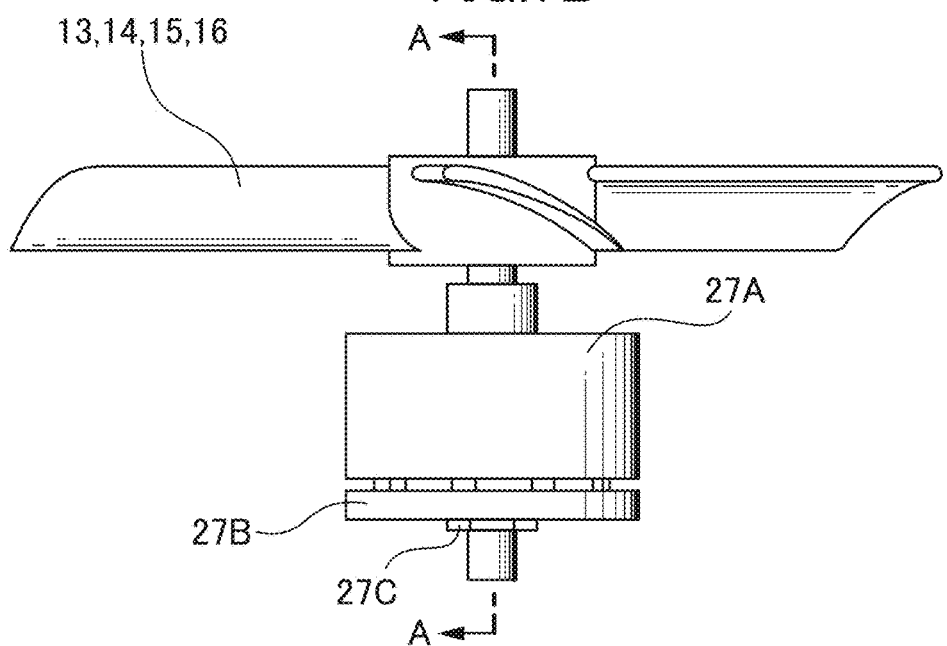
FIG. 7B is a diagram of the rotors and the motor members illustrated in FIG. 7A in a positive direction of x.
Figure 7C:
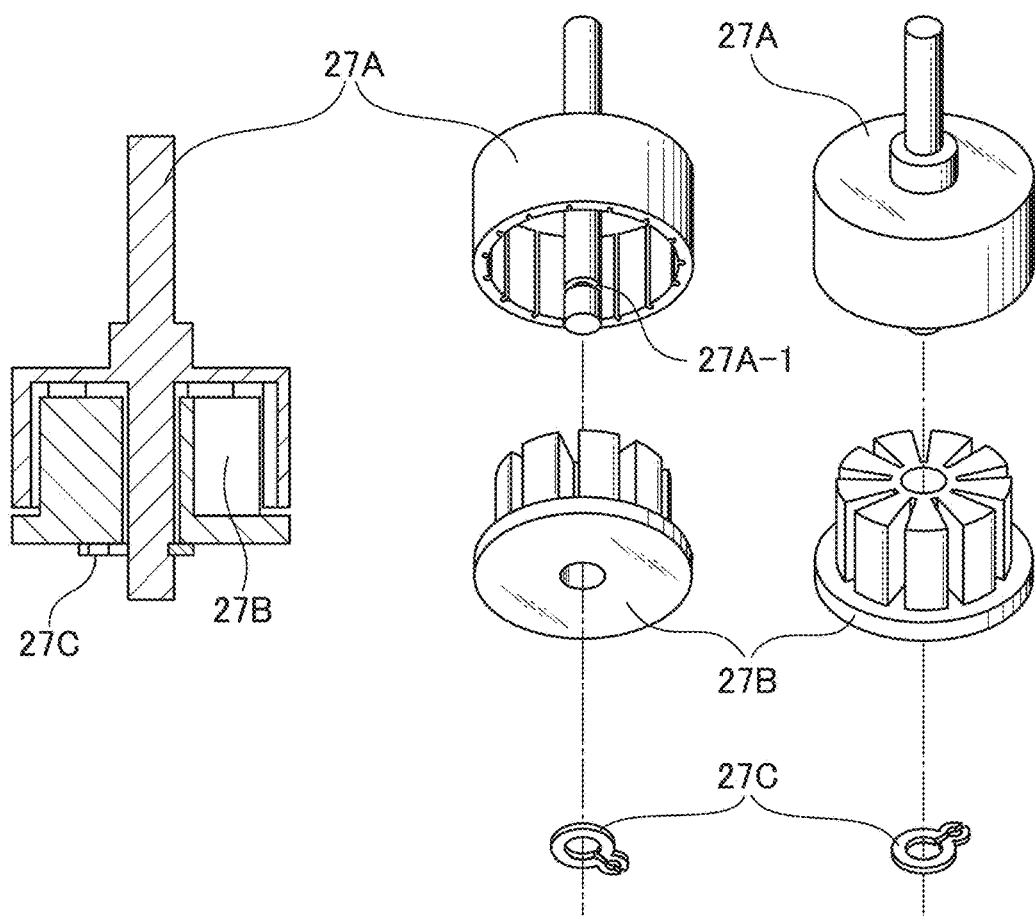
FIG. 7C is a diagram illustrating a cross section cut along a plane A-A in FIG. 7B of the motor members illustrated in FIG. 7A and each of the motor members.

As illustrated in FIG. 1C, the motors 17 and 19 are configured to be respectively positioned above rotors 13 and 15 (at a position where a gravity potential is high) to drive the rotors 13 and 15. The motors 18 and 20 (see FIG. 9) are also similarly configured to be respectively positioned on the rotors 14 and 16 to drive the rotors. An advantage of adopting such a configuration will be described while comparing the configuration with that in the comparative example in which motors are positioned below the rotors, as illustrated in FIGS. 7A to 7C. Note that the unmanned aerial vehicle, the flight control mechanism for the unmanned aerial vehicle, and the method of using these can also be implemented even if a positional relationship between the rotors and the motors as in the comparative example is adopted.

FIG. 7A is a perspective view illustrating a positional relationship between rotors and motor members in the comparative example, FIG. 7B is a diagram of the rotors and the motor members illustrated in FIG. 7A as viewed in a positive direction of x in FIG. 7A, and FIG. 7C is a diagram illustrating a cross section cut along a plane A-A in FIG. 7B and each of the motor members. The rotors 13, 14, 15, and 16 are fixed to a rod-shaped protrusion (see FIG. 7C) of a motor member 27A (see FIG. 7B), and rotate with the rod-shaped protrusion as a rotation axis. The rotors 13, 14, 15, and 16 receive a force in an arrow direction (in a positive direction of z) in FIG. 7A by rotating, to pull the motor member 27A in the same direction. As illustrated in FIG. 7C, the motor member 27A and a motor member 27B are fitted to each other, and do not necessarily adhere to each other. Therefore, if the motor member 27A is pulled in the positive direction of z, the motor member 27A may separate from the motor member 27B. To prevent the separation, a motor member 27C is used as a fastener in the configuration in the comparative example (see FIGS. 7B and 7C). As illustrated in FIG. 7C, when the motor member 27C is fitted in a groove 27A-1 provided in the motor member 27A (After the motor member 27A and the motor member 27B are fitted to each other.), the motor member 27A can be prevented from separating from the motor member 27B. However, the motor member 27C needs to be detached when the motors are maintained.

Figure 8:
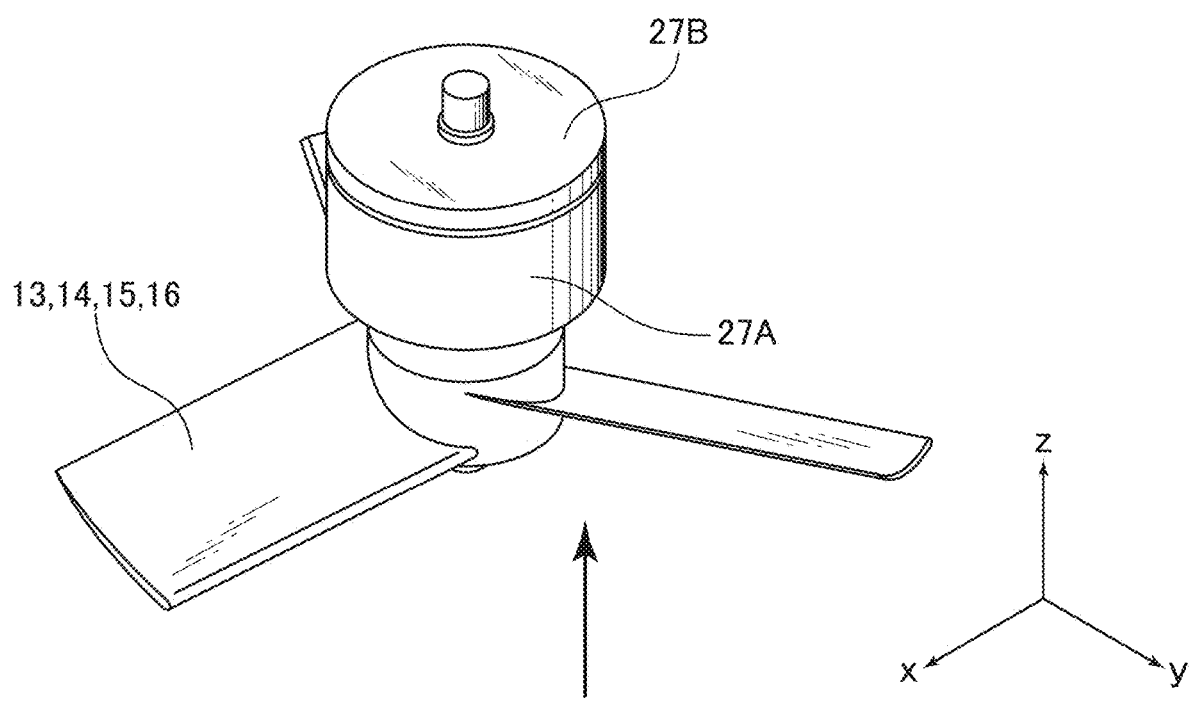
FIG. 8 is a perspective view illustrating a positional relationship between rotors and motor members in the present embodiment.

A positional relationship between rotors and motor members in the present embodiment is illustrated in a perspective view of FIG. 8. The present embodiment is similar to the comparative example except that the rotors 13, 14, 15, and 16 are positioned below the motor members 27A and 27B and that the motor member 27C is not used. The rotors 13, 14, 15, and 16 are fixed to a rod-shaped protrusion (see FIG. 7C) of the motor member 27A (see FIG. 7B), and rotate with the rod-shaped protrusion as a rotation axis. The rotors 13, 14, 15, and 16 receive a force in an arrow direction (in a positive direction of z) in FIG. 8A by rotating, to press the motor member 27A in the same direction. As a result, since the motor member 27A is pressed against the motor member 27B, the motor member 27A need not be prevented from separating from the motor member 27B. Therefore, in a configuration illustrated in FIG. 8, the motor member 27C is not required so that the motors are easily maintained.

Figure 9:
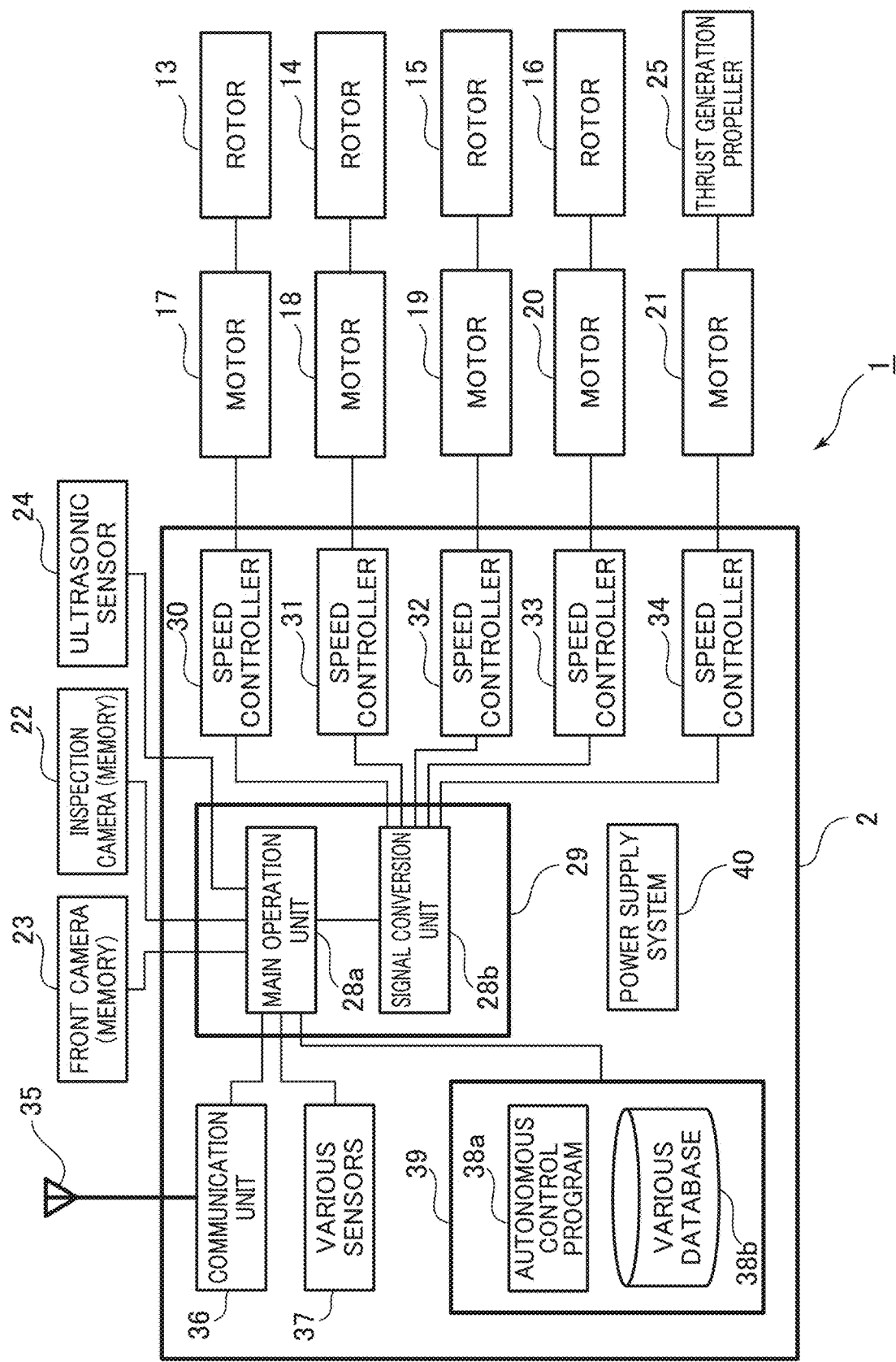
FIG. 9 is a block diagram illustrating a functional configuration of the unmanned aerial vehicle illustrated in FIG. 1A.

FIG. 9 is a block diagram illustrating a functional configuration of the unmanned aerial vehicle illustrated in FIG. 1A. The main body section 2 in the unmanned aerial vehicle 1 includes a main operation unit 28a including a processor, a temporary memory, and the like to perform various types of operations, a signal conversion unit 28b including a processor, a temporary memory, and the like, which performs processing for converting control command value data obtained by an operation by the main operation unit 28a into a pulse signal (PWM: a pulse width modulation signal) (An operation unit including the main operation unit 28a and the signal conversion unit 28b is referred to as a control signal generation unit 29.), speed controllers (ESC: electric speed controllers) 30 to 34 that convert the pulse signal generated by the control signal generation unit 29 into driving currents, respectively, to the motors 17 to 21, a communication antenna 35 and a communication unit (including a processor, a temporary memory, and the like) 36 that transmit and receive various types of data signals to and from outside, a sensor unit 37 including various types of sensors such as a GPS (global positioning system) sensor, an attitude sensor, an altitude sensor, and a direction sensor, a recording apparatus 39 including a recording device such as a hard disk drive that records an autonomous flight program 38a, various types of databases 38b, and the like, and a power supply system 40 including a battery device such as a lithium polymer battery or a lithium ion battery and a power distribution system to each of elements.

In addition, the unmanned aerial vehicle 1 may include any functional unit, information, and the like depending on a functional use. As an example, if the unmanned aerial vehicle 1 autonomously flies according to a flight plan, flight plan information, which is data representing a flight plan as any rule to follow during flight, such as a flight plan path as a set of a start position and a destination of flight, and a check point position (a latitude, a longitude, and an altitude) through which the unmanned aerial vehicle 1 is to pass until it reaches the destination after starting at the start position, a speed limit, and an altitude limit is recorded in the recording apparatus 39, and the main operation unit 28a reads the flight plan information to execute the autonomous control program 38a so that the unmanned aerial vehicle 1 flies according to the flight plan. Specifically, the flight of the unmanned aerial vehicle 1 is controlled by determining a current position, a speed, and the like of the unmanned aerial vehicle 1 based on information obtained from the various types of sensors in the sensor unit 37, comparing the determined current position, speed, and the like with respective target values of the flight plan path, the speed limit, the altitude limit, and the like determined in the flight plan to operate respective control command values for the rotors 13 to 16 and the thrust generation propeller 25 in the main operation unit 28a, converting data respectively representing the control command values into pulse signals (generating control signals) and transmitting the pulse signals to the speed controllers 30 to 34 in the signal conversion unit 28b, respectively converting the pulse signals into driving currents and outputting the driving currents to the motors 17 to 21 in the speed controllers 30 to 34, and controlling drives of the motors 17 to 21 to control respective rotational speeds and the like of the rotors 13 to 16 and the thrust generation propeller 25. As an example, control is performed to increase the respective numbers of rotations of the rotors 13 and 16 for a control command to increase the altitude of the unmanned aerial vehicle 1 (decrease the numbers of rotations when the altitude is decreased), increase the number of rotations of the thrust generation propeller 25 for a control command to accelerate the unmanned aerial vehicle 1 in a forward direction (in the position direction of x in FIG. 1A) (decrease the numbers of rotations when the unmanned aerial vehicle 1 is decelerated), and decrease the respective numbers of rotations of the rotors 14 and 16 for a control command to incline the unmanned aerial vehicle 1 by rolling around the x-axis illustrated in FIG. 1A (in a counterclockwise direction as viewed in the positive direction of x) to maintain the respective numbers of rotations of the rotors 13 and 15, for example. Note that the acceleration (deceleration) in the forward direction of the unmanned aerial vehicle 1 can also be performed by controlling the respective numbers of rotations of the rotors 13 to 16, for example, decreasing the respective numbers of rotations of the rotors 13 and 14 to increase the respective numbers of rotations of the rotors 15 and 16 (opposite control when the unmanned aerial vehicle 1 is decelerated), and the unmanned aerial vehicle 1 can also be flown without using the thrust generation propeller 25. Note that simplified control can be performed. For example, the speed of the unmanned aerial vehicle 1 in the forward direction (in the positive direction of x in FIG. 1A) can be performed by making all the respective numbers of rotations of the rotors 13 to 16 equal to one another (performing control to only equally increase or decrease the respective numbers of rotations of all the four rotors 13 to 16) to float and land (or land on water) the unmanned aerial vehicle 1 and controlling the number of rotations of the thrust generation propeller 25. Flight recording information such as a flight path through which the unmanned aerial vehicle 1 has actually flown (e.g., a position of the aircraft of the unmanned aerial vehicle 1 at each time point) and various types of sensor data are recorded on various types of databases 38b, as needed, during flight.

As examples of the autonomous flight type unmanned aerial vehicle, Mini Surveyor ACSL-PF1 (Autonomous Control Systems Laboratory Ltd.), Snap (Vantage Robotics), AR. Drone 2.0 (Parrot), and Bebop Drone (Parrot), for example, are commercially available.

Note that when the unmanned aerial vehicle 1 flies under control from outside, the unmanned aerial vehicle 1 receives data representing a control command value received from a controller device or the like of the operator using the communication antenna 35 and the communication unit 36, converts the data into a pulse signal using the signal conversion unit 28b (generates a control signal), and controls respective rotational speeds of the rotors 13 to 16 and the thrust generation propeller 25 using the speed controllers 30 to 34 and the motors 17 to 21, to perform flight control. Even in this case, when the main operation unit 28a reads data representing attitude information of the unmanned aerial vehicle 1 obtained from the attitude sensor (a gyro sensor or a magnetic sensor) among the various types of sensors in the sensor unit 37 to execute the autonomous control program 38a, partial autonomous control and control from outside can also be combined with each other. For example, a command value of attitude control is operated by comparing the data from the attitude sensor with a target value of an attitude, for example, to perform attitude control (In this case, the main operation unit 28a operates a final control command value by executing the autonomous control program 38a based on data representing a control command value received from an external controller device or the like and data representing the command value of the attitude control. When the signal conversion unit 28b converts data representing the control command value into a pulse signal, a control signal including an attitude control signal is generated.). Although it is assumed that the unmanned aerial vehicle 1 basically flies in response to a control signal from the external controller device or the like in shooting flight described below, and only an attitude is autonomously controlled, similar shooting flight can also be performed by the unmanned aerial vehicle 1 that performs fully autonomous control flight and fully external control flight.

Shooting Flight in Closed-Type Space by Unmanned Aerial Vehicle

As an example of shooting flight in a closed-type space by the unmanned aerial vehicle 1, shooting flight in a sewage pipeline will be described below with reference to FIGS. 10 to 14. Note that a use of the unmanned aerial vehicle, the flight control mechanism for the unmanned aerial vehicle, and the method using these according to the present invention as already described is not limited to such shooting flight, but an unmanned aerial vehicle, a flight control mechanism for the unmanned aerial vehicle, and a method using these according to the present invention can be used in any environment and for any purpose.

Figure 10:
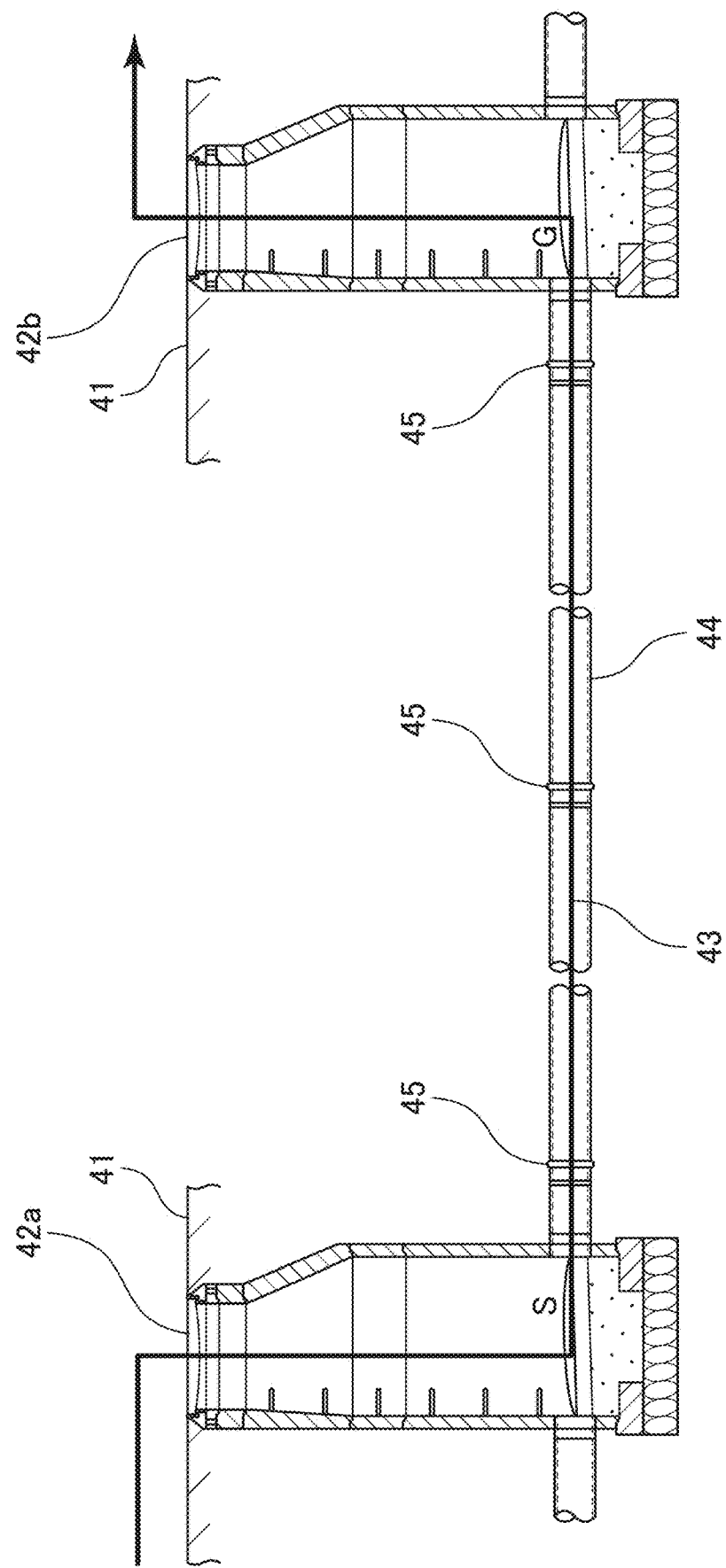
FIG. 10 is a diagram illustrating a structure of a sewage pipeline facility capable of flying the unmanned aerial vehicle illustrated in FIG. 1A.

FIG. 10 illustrates a structure of a sewage pipeline facility capable of flying the unmanned aerial vehicle illustrated in FIG. 1A. A manhole 42a provided on a ground surface 41 leads to the sewage pipeline 43, and follows the sewage pipeline 43 in a rightward direction in FIG. 10 to reach another manhole 42b (Although the sewage pipeline 43 is drawn by being cut at two points in the middle in FIG. 10, this is a representation used for convenience and is actually formed as a consecutive sewage pipeline 43 longer than that illustrated.). A boundary surface of the closed-type space is defined by an inner wall 44 in the sewage pipeline 43, and a connection section 45 exists for each predetermined distance in the rightward direction in FIG. 10 in the sewage pipeline 43.

In performing the shooting flight in the sewage pipeline 43 by the unmanned aerial vehicle 1, the unmanned aerial vehicle 1 is advanced into the manhole 42a and dropped to a depth of the sewage pipeline 43. In an example, a holding table is provided at a distal end of a pole having approximately the same length as the depth of the manholes 42a and 42b, and the pole is inserted into the manhole 42a with the unmanned aerial vehicle 1 loaded on the holding table to drop the unmanned aerial vehicle 1. If the autonomous flight type unmanned aerial vehicle 1 is used, a position of the manhole 42a, the depth of the sewage pipeline 43, and the like may be previously recorded as a flight plan path on the recording apparatus 39, and the main operation unit 28a may read the flight plan information including data of the flight plan path and execute the autonomous control program 38a to autonomously fly the unmanned aerial vehicle 1 and guide the unmanned aerial vehicle 1 to one end of the sewage pipeline 43 (a left end in the sewage pipeline 43 in FIG. 10, which is hereinafter referred to as a shooting flight start position S), or may transmit a control signal to the unmanned aerial vehicle 1 from the external controller device and steer the unmanned aerial vehicle 1 to guide the unmanned aerial vehicle 1 to the shooting flight start position S.

Figure 11:
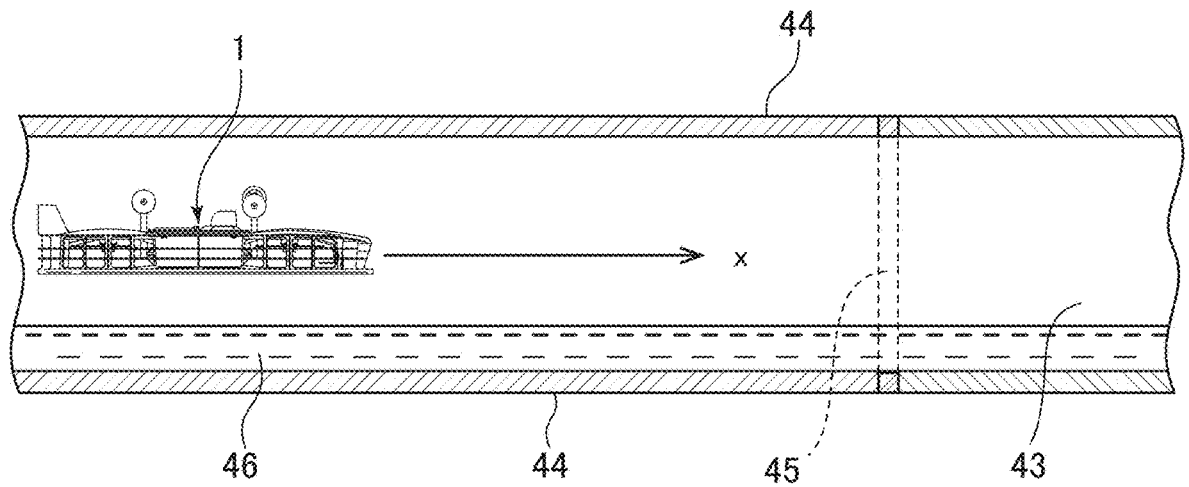
FIG. 11 is a diagram illustrating the unmanned aerial vehicle illustrated in FIG. 1A that flies in a tubular space in the sewage pipeline facility illustrated in FIG. 10.

The unmanned aerial vehicle 1 starts the shooting flight in the rightward direction in FIG. 10 (with the direction used as the positive direction of x in FIG. 1A, i.e., the traveling direction) from the shooting flight start position (FIG. 11). With manual control by the operator from the external controller, the inspection camera 22 and the front camera 23 shoot a still image or a moving image within the sewage pipeline 43 while the unmanned aerial vehicle 1 is flying in the traveling direction upon receiving a control signal for issuing a forward instruction. Note that although water 46 normally exists in the sewage pipeline 43, and its water level varies, as needed, a float force can also be obtained by a water surface effect produced by rotation of the rotors 13 to 16 can also be obtained (If there is no water 46, a similar effect can also be obtained from the inner wall 44.).

Data of the still image or the moving image shot by the inspection camera 22 is recorded in a built-in memory in the inspection camera 22, and data of the still image or the moving image shot by the front camera 23 is transmitted, as needed, to an external computer of the operator from the communication antenna 35 by the communication unit 36 after being recorded in a built-in memory in the front camera 23. The operator displays the still image or the moving image shot by the front camera 23 on a display provided in the external computer using the received data, and steers the unmanned aerial vehicle 1 by the external controller while confirming the still image or the moving image (If a communication quality between the external controller and the communication antenna 35 is not sufficient, a radio relay station is preferably previously installed in the sewage pipeline 43. A GPS signal can also be received similarly via the radio relay station.). In an example, the unmanned aerial vehicle 1 is steered while a distance by which the unmanned aerial vehicle 1 has advanced with the connection section 45 reflected on the displayed still image or moving image used as a landmark.

Figure 12A:
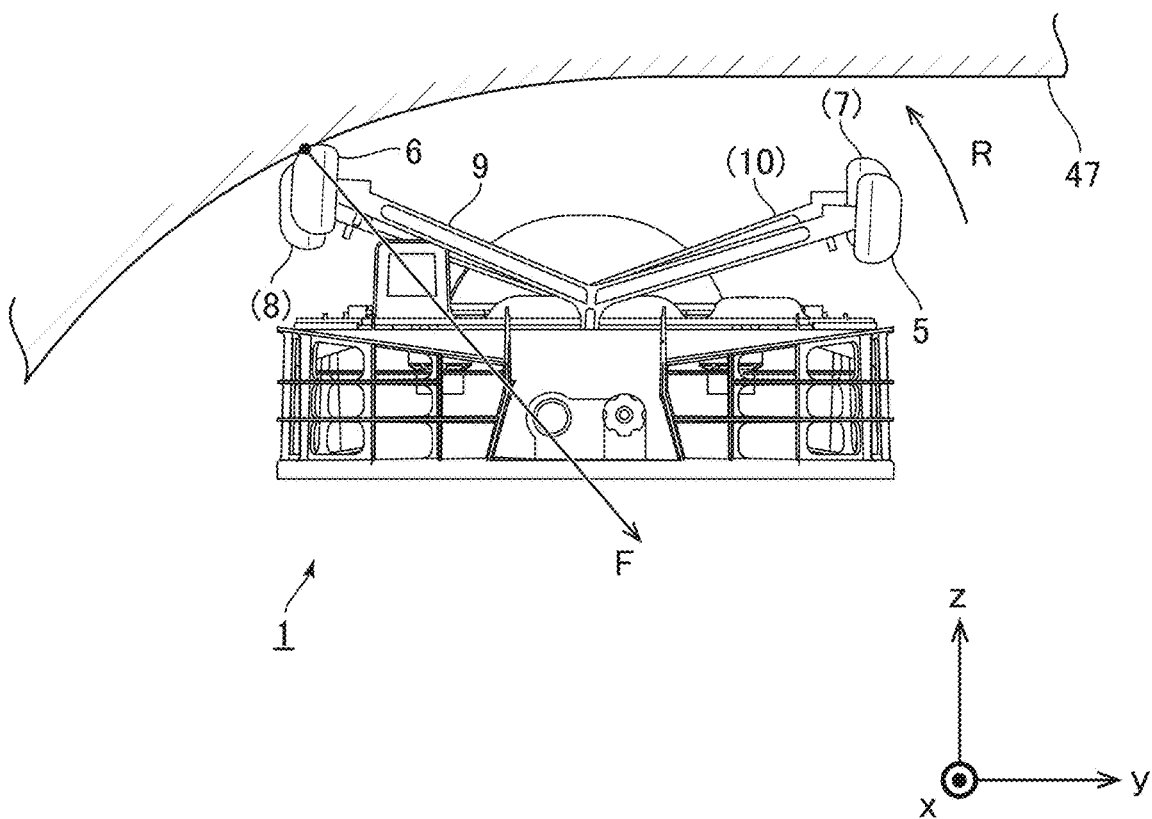
FIG. 12A is a diagram illustrating how a preceding collision member collides with an inner wall of a sewage pipeline during flight illustrated in FIG. 11.

During the shooting flight, the unmanned aerial vehicle 1 may excessively rise to collide with the inner wall 44 of the sewage pipeline 43 due to any reason such as an accuracy problem of manual control by the external controller or an accuracy problem of autonomous attitude control. A situation at this time is illustrated in FIG. 12A. The preceding collision member 6 (as a rotary member such as a wheel or a roller) held by the holding member 9 in the unmanned aerial vehicle 1 contacts the boundary surface 47 between the sewage pipeline 43 and the inner wall 44, and a force in an arrow direction indicated by F in FIG. 12A is exerted on the preceding collision member 6 from the inner wall 44. This force is exerted as a force for rotating the holding member 9 (with the shaft section for holding member 11A as a fixed rotation axis) in an arrow direction indicated by R in FIG. 12A.

Figure 12B:
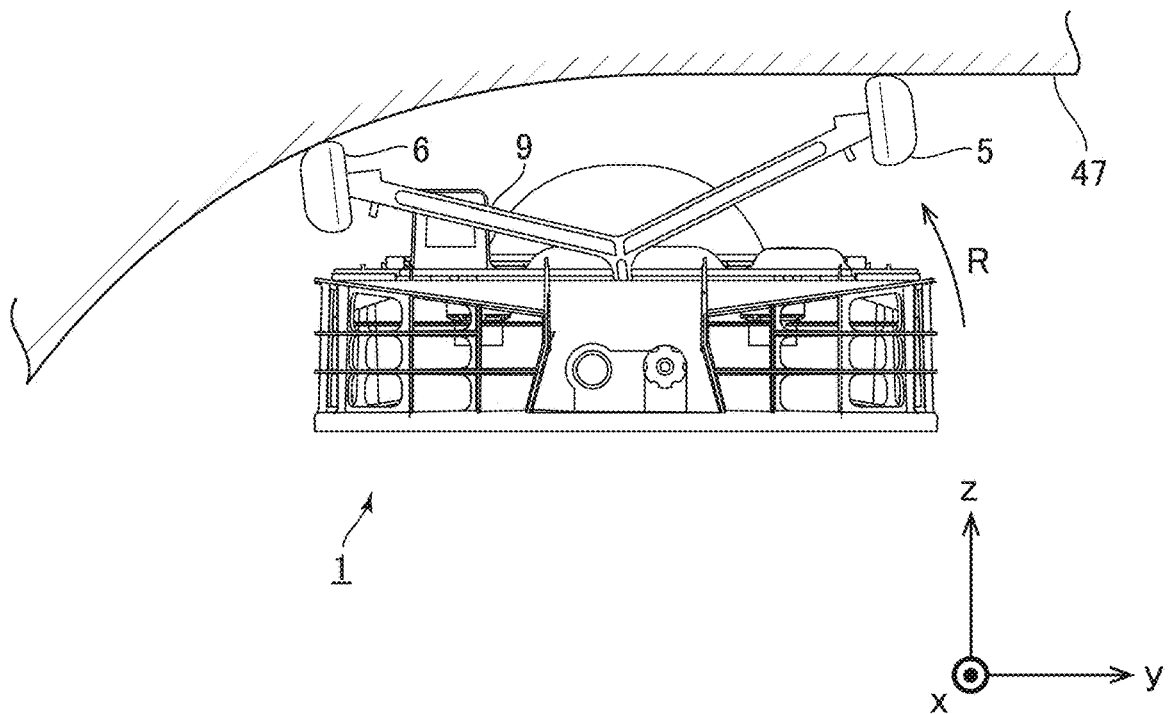
FIG. 12B is a diagram illustrating how the holding member rotates in response the collision illustrated in FIG. 12A and the other preceding collision member to be held by the holding member also collides with the inner wall in response to rise of the vehicle body.
Figure 12C:
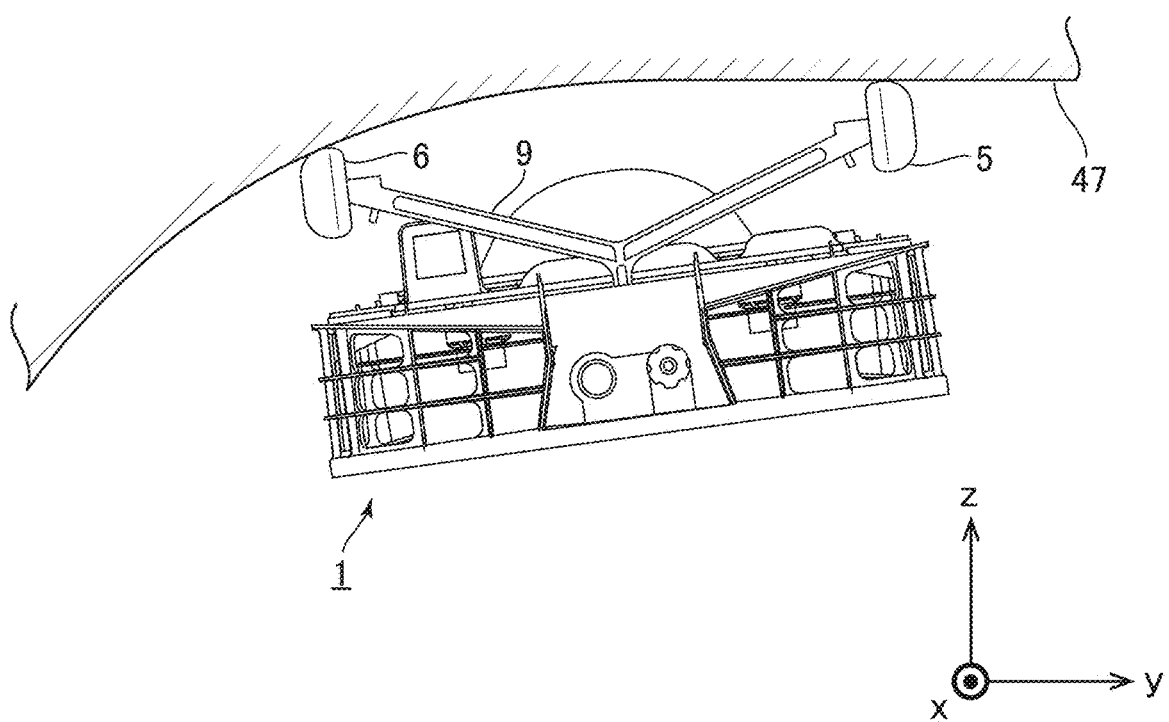
FIG. 12C is a diagram illustrating how the vehicle body is inclined after the holding member illustrated in FIG. 12B is inclined.

When the holding member 9 rotates as described above, and the vehicle body further rises, both the rotary members 5 and 6 to be held by the holding member 9 contact the boundary surface 47, as illustrated in FIG. 12B. The rotary members 7 and 8 to be held by the holding member 10 also contact the boundary surface 47 in a similar principle (Some of the rotary members may not contact the boundary surface 47 depending on a shape of the boundary surface.). Assuming that the holding member 9 is attached to be rotatable around a position lower than the corresponding set of rotors 13 and 14 (in the negative direction of z in FIG. 1A) with the vehicle body not inclined, and the holding member 10 is attached to be rotatable around a position lower than the corresponding set of rotors 15 and 16 (in the negative direction of z in FIG. 1A) with the vehicle body similarly not inclined, the vehicle body is inclined in a similar direction to the direction of the inclination of the holding members 9 and 10, as described with reference to FIGS. 5A to 5E (FIG. 12C). In this state, if the unmanned aerial vehicle 1 is flown in an x-direction in FIG. 12C, for example, (In the present specification. "fly" also includes the unmanned aerial vehicle moving while floating with the components of the unmanned aerial vehicle contacting the boundary surface.), the unmanned aerial vehicle 1 flies along the boundary surface 47 while the rotary member, which contacts the boundary surface 47, among the rotary members 5 to 8 is rotating (see FIG. 3B). Note that it is not essential to incline the vehicle body, as illustrated in FIG. 12C. The unmanned aerial vehicle 1 can also fly along the boundary surface 47 with the vehicle body not inclined. Alternatively, the unmanned aerial vehicle 1 can fly along the boundary surface 47 even if the vehicle body is inclined in an opposite direction, as described with reference to FIGS. 6A to 6E. If the preceding collision members 5 to 8 are not each a rotary member such as a wheel or a roller, but are each a member fixed to the holding member, as described with reference to FIG. 4, for example, the unmanned aerial vehicle 1 flies along the boundary surface 47 while the preceding collision member, which contacts the boundary surface 47, among the preceding collision members 5 to 8 is sliding.

Figure 13A:
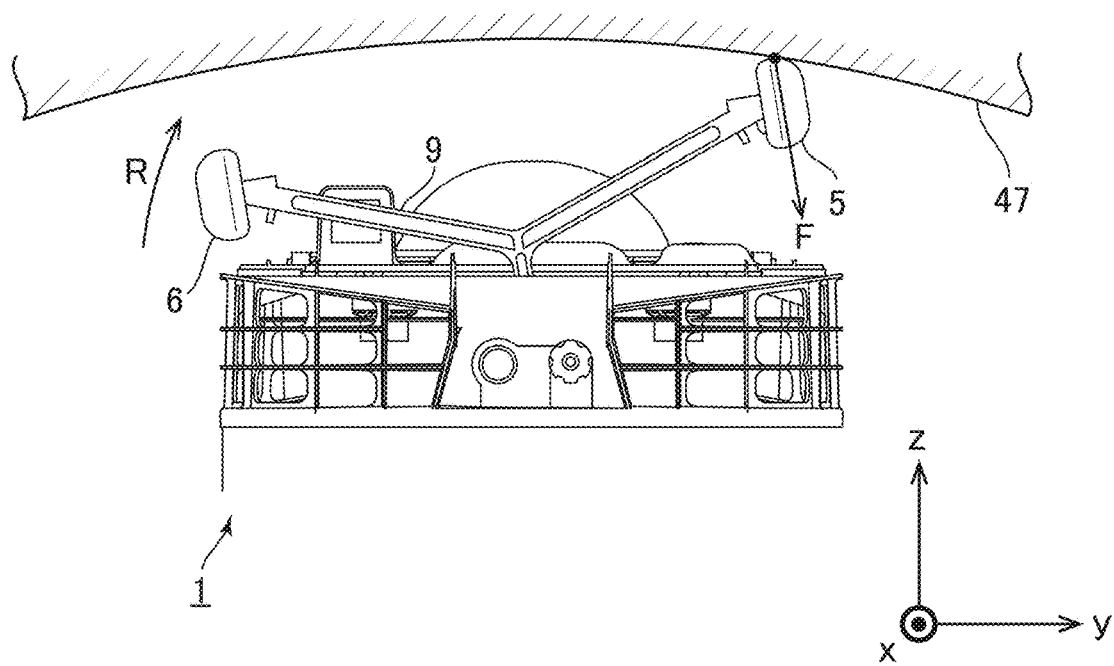
FIG. 13A is a diagram illustrating how the preceding collision member collides with the inner wall of the sewage pipeline (at a position different from a collision position illustrated in FIG. 12A) during flight illustrated in FIG. 11.
Figure 13B:
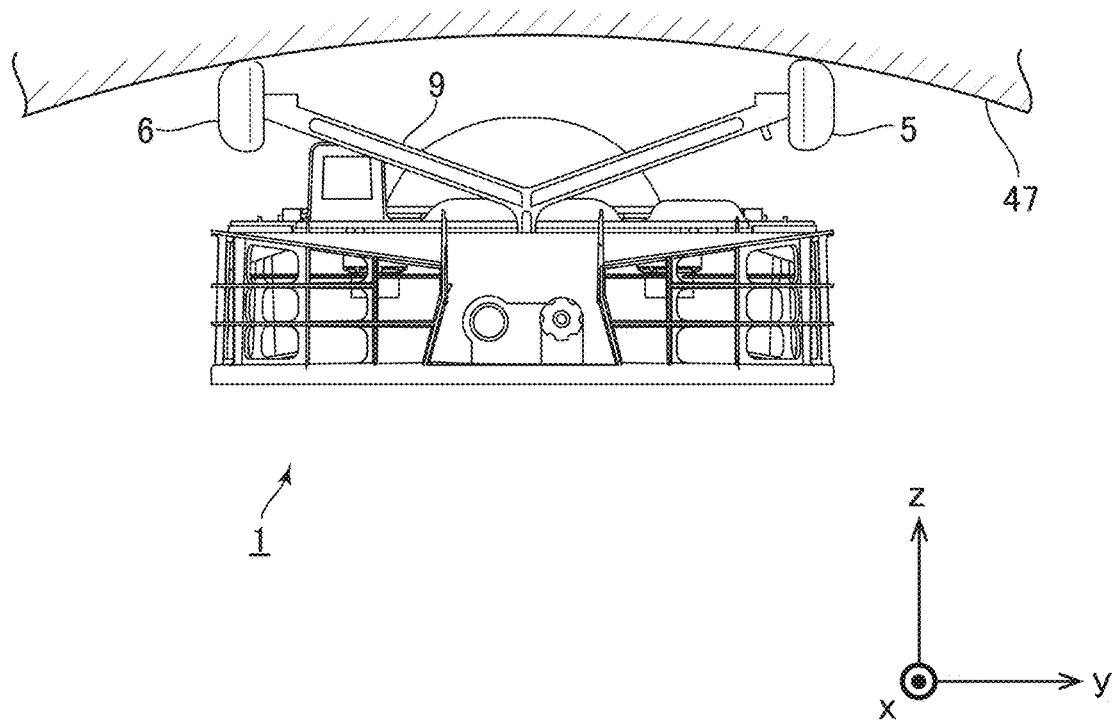
FIG. 13B is a diagram illustrating how the holding member rotates in response the collision illustrated in FIG. 13A and the other preceding collision member to be held by the holding member also collides with the inner wall in response to rise of the vehicle body.

Note that although description has been made assuming that the boundary surface 47 is inclined in one direction in a region with which the preceding collision member collies in an example illustrated in FIGS. 12A to 12C, even if the preceding collision member collies with a flat region on the boundary surface 47, a region symmetrically inclined in both directions, or the like, the unmanned aerial vehicle 1 can basically be flown along the boundary surface 47 in a similar principle. As an example, when the preceding collision member 5 contacts the region on the boundary surface 47 illustrated in FIG. 13A, a force is exerted on the preceding collision member 5 from the inner wall 44 in an arrow direction indicated by F in FIG. 13A, and the holding member 9 rotates in an arrow direction indicated by R in FIG. 13A. When the vehicle body further rises, both the preceding collision members 5 and 6 to be held by the holding member 9 contact the boundary surface 47, as illustrated in FIG. 13B. The preceding collision members 7 and 8 to be held by the holding member 10 also contact the boundary surface 47 in a similar principle (Some of the rotary members may not contact the boundary surface 47 depending on a shape of the boundary surface.). Hereinafter, the unmanned aerial vehicle 1 can fly along the boundary surface 47 in a similar principle. If the preceding collision member is a rotary member such as a wheel or a roller, the unmanned aerial vehicle 1 flies along the boundary surface 47 while rotating the rotary member that has contacted the boundary surface 47. With a member described with reference to FIG. 4, the unmanned aerial vehicle 1 flies along the boundary surface 47 while sliding the member on the boundary surface 47.

Figure 14:
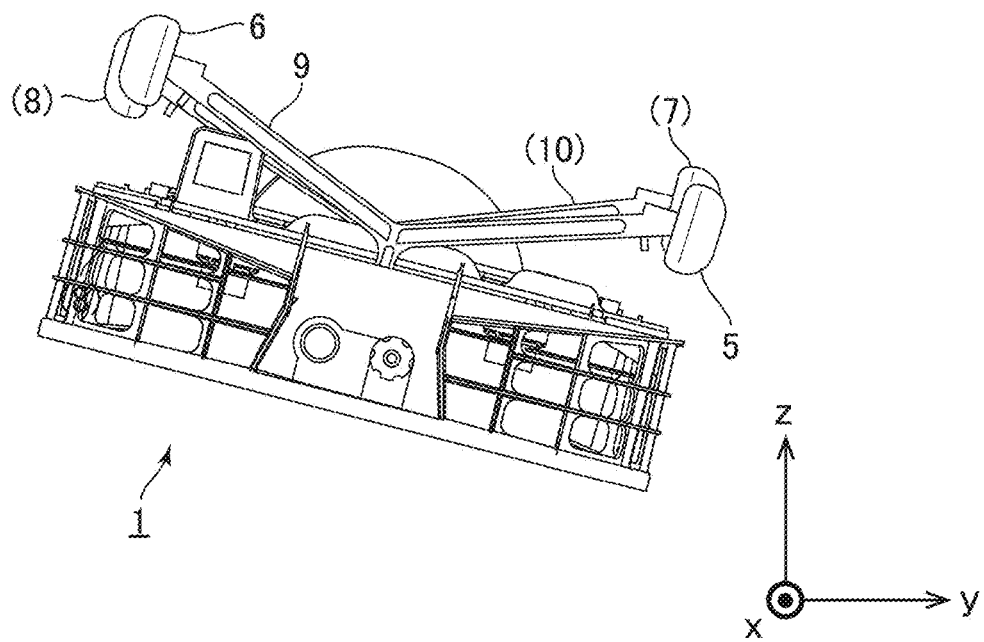
FIG. 14 is a diagram illustrating how the unmanned aerial vehicle illustrated in FIG. 1A is inclined by rotating (rolling) around an x-axis.

Note that the unmanned aerial vehicle 1 may be inclined due to any reason such as an accuracy problem of manual control and autonomous attitude control during the shooting flight in addition to or in a case other than a case where the preceding collision member collides with the boundary surface 47, as described above. As an example, FIG. 14 illustrates how the unmanned aerial vehicle 1 is inclined by rotating (rolling) around the x-axis illustrated in FIG. 1A. If the preceding collision member does not contact the boundary surface 47, for example, the lower side (the side in the positive direction of y) of the vehicle body can be raised by increasing the respective numbers of rotations of the rotors 13 and 15 to recover the attitude of the vehicle body to be horizontal. However, in this case, the vehicle body rises so that the unmanned aerial vehicle 1 may collide with an upper surface of the inner wall 44. As described with reference to FIGS. 12A to 13B, if the unmanned aerial vehicle 1 flies along the boundary surface 47 with the inner wall 44, the collision need not particularly be prevented. However, if the unmanned aerial vehicle 1 is desired to be flown while avoiding contact with the boundary surface 47, the respective numbers of rotations of the rotors 14 and 16 are preferably reduced to lower the higher side (the side in the negative direction of y) of the vehicle body and recover the attitude to be horizontal. Although such attitude control is typically performed when the main operation unit 28a reads data representing the attitude information of the unmanned aerial vehicle 1 obtained from the attitude sensor, as described above, and executes the autonomous control program 38a, the attitude control may be performed by transmitting a control signal representing a control command value of an attitude from the external controller device (a control signal including an attitude control signal for issuing an instruction to roll in an opposite direction to that of the inclination illustrated in FIG. 14), receiving the control signal in the unmanned aerial vehicle 1, and executing the autonomous control program 38a in the main operation unit 28a. The attitude can be recovered by similarly reducing the respective numbers of rotations of some of the rotors for the inclination of the unmanned aerial vehicle 1 by any rotation such as rotation around a y-axis (a pitch) or a z-axis (a yaw).

The unmanned aerial vehicle 1 reaches the other end of the sewage pipeline 43 (a right end in the sewage pipeline in FIG. 10, which is hereinafter referred to as a shooting flight end position G), the shooting flight ends. A pole having a holding table provided at its distal end is inserted into the manhole 42b, and the unmanned aerial vehicle 1 is loaded on the holding table and is pulled up, for example, to recover the unmanned aerial vehicle 1. The unmanned aerial vehicle 1 may be pulled up from the end position G by autonomous flight, like when the unmanned aerial vehicle 1 is guided into a shooting flight start position S. Respective states of the sewage pipeline 43, the inner wall 44, and the like can be confirmed by detaching the inspection camera 22 from the recovered unmanned aerial vehicle 1 and seeing a still image or a moving image recorded in the memory of the inspection camera 22.

Figure 15:
FIG. 15 is a diagram illustrating an example of an image in the sewage pipeline shot by a front camera.

FIG. 15 illustrates an example of an image in the sewage pipeline shot by the front camera. A similar image can be obtained by the shooting flight of the unmanned aerial vehicle 1 loaded with the front camera 23. The operator can steer the unmanned aerial vehicle 1 using the external controller device while seeing a still image or a moving image at a first person view shot by the front camera 23 as illustrated in FIG. 15. After the shooting flight, the state of the sewage pipeline 43, for example, a crack of the inner wall 44 or a shift of a packing in the connection section 45 can be confirmed by detaching the inspection camera 22 from the recovered unmanned aerial vehicle 1 and seeing a still image or a moving image recorded in the memory.

INDUSTRIAL APPLICABILITY

The present invention can be used for shooting inspection in any closed-type space such as the inside of a water supply pipeline, the inside of a sewage pipeline, the inside of a drainage channel, the inside of a tunnel of a highway, the inside of a drainage pipe of the highway, the inside of a cave passage, the inside of a duct, the inside of a pipe shaft, or the inside of a gas pipeline. The present invention is also usable when an unmanned aerial vehicle (unmanned flying object) is flown for any purpose in any space other than a closed-type space.

REFERENCE SIGNS LIST 1 unmanned aerial vehicle, unmanned flying object
2 main body section
3 waterproof case
4 frame
4a frame rear section
4b, 4c through hole
4A to 4D rotation stop position
5 to 8 preceding collision member
5A to 8A shaft section for preceding collision member
9, 10 holding member
9A, 10A hole
9B-1, 9B-2, 10B-1, 10B-2 preceding collision member attachment member
9C-1, 9C-2, 10C-1, 10C-2 hole
11, 12 holding member attachment member
11A, 12A shaft section for holding member
13 to 16 rotor
17 to 21 motor
22 inspection camera
23 front camera
24 ultrasonic sensor
25 thrust generation propeller
26 center of gravity
27A motor member
27B motor member
27C motor member
27A-1 groove
28A main operation unit
28b signal conversion unit
29 control signal generation unit
30 to 34 speed controller
35 communication antenna
36 communication unit
37 various types of sensors
38a autonomous control program
38b various types of databases
39 recording apparatus
40 power supply system
41 ground surface
42a, 42b manhole
43 sewage pipeline, inspection space
44 inner wall
45 connection section
46 water
47 boundary surface

The invention claimed is:

1. An unmanned aerial vehicle comprising two or more flight control mechanisms, each flight control mechanism comprising:
a first preceding impactor;
a second preceding impactor; and
a holder which holds the first and the second preceding impactors with a distance above a vehicle body of the unmanned aerial vehicle, wherein the holder can be inclined with respect to the vehicle body by rotating toward the lateral side of the vehicle body around a predetermined position in the vehicle body or on the vehicle body, and the holder rotates responsive to one of the first and the second preceding impactors colliding with a boundary surface, wherein the first and the second preceding impactors are positioned on one said holder and on a line apart from each other in a direction of a width of the vehicle body, where the holder is configured to rotate by an acting force from the boundary surface responsive to one of the first and the second preceding impactors colliding with the boundary surface and both of the first and the second preceding impactors touch the boundary surface according to ascension of the vehicle body,
wherein the two or more flight control mechanisms are apart from each other in front and behind in a direction different from a direction of a rotation toward the lateral side of the vehicle body at the holder;
wherein the vehicle body comprises fixed shaft sections for the holders each of which are separately from each other and corresponds to each of the holders in the two or more flight control mechanisms;
wherein each of the holders are rotatably attached to the vehicle body with the corresponding shaft section for the holder used as a rotation axis so that each of the holders can rotate independently of each other;
wherein the unmanned aerial vehicle is configured to fly along the boundary surface by flying with the first and the second preceding impactors of the respective flight control mechanisms touching the boundary surface.

2. The unmanned aerial vehicle according to claim 1, wherein the first and the second preceding impactors are rotators, and the flight control mechanism is configured so that the first and the second rotators rotate when the unmanned aerial vehicle flies while the first and the second rotators are touching the boundary surface.

3. The unmanned aerial vehicle according to claim 1 comprising:
at least four rotary wings;
a drive device which drives the rotary wings; and
a control signal generation unit which generates a control signal for causing the drive device to drive the rotary wings.

4. The unmanned aerial vehicle according to claim 3 comprising:
two sets of rotary wings as the at least four rotary wings where each set consists of two rotary wings distanced in left and right; and
the flight control mechanism for each one set of the two sets wherein in each set, the predetermined position is below the positions of the two rotary wings included in that set in a state where the vehicle body is not inclined.

5. The unmanned aerial vehicle according to claim 3 wherein the control signal includes an attitude control signal, and the unmanned aerial vehicle is configured to control the attitude of the unmanned aerial vehicle by causing the drive device to drive the rotary wings with the attitude control signal to reduce the number of rotations of at least one or some of the rotary wings when the unmanned aerial vehicle is inclined.

6. The unmanned aerial vehicle according to claim 3, wherein the drive device includes a plurality of motors which respective motors provide the respective rotary wings with motive powers, respectively, and respective motors are configured to provide respective rotary wings with motive powers, respectively, at a position with a higher gravitational potential than the rotary wing which receives motive power from the each motor.

7. The unmanned aerial vehicle according to claim 3, further comprising a thrust generation propeller, wherein the unmanned aerial vehicle is configured to propel by rotations of the thrust generation propeller while floating by rotations of the at least four rotary wings.

8. The unmanned aerial vehicle according to claim 3, further comprising a shooting camera, wherein the unmanned aerial vehicle is configured to fly inside a closed-type space by driving the rotary wings while shooting inside the closed-type space using the shooting camera.

9. The unmanned aerial vehicle according to claim 8 further comprising a traveling direction shooting camera and a traveling direction shooting data transmission unit, wherein the unmanned aerial vehicle is configured to fly while shooting in the traveling direction by the traveling direction shooting camera and transmitting obtained traveling direction shooting data from the traveling direction shooting data transmission unit to the outside.

10. A method for flying an unmanned aerial vehicle along a boundary surface, the unmanned aerial vehicle comprises two or more flight control mechanisms, each flight control mechanism comprises:
 a first preceding impactor;
 a second preceding impactor; and
 a holder which holds the first and the second preceding impactors separately above a vehicle body of the unmanned aerial vehicle, wherein the holder can be inclined with respect to the vehicle body by rotating toward the lateral side of the vehicle body around a predetermined position in the vehicle body or on the vehicle body, and the holder rotates by an acting force from the boundary surface responsive to one of the first and the second preceding impactors colliding with a boundary surface and makes both of the first and the second preceding impactors touch the boundary surface according to ascension of the vehicle body, wherein the first and the second preceding impactors are positioned on one said holder and on a line apart from each other in a direction of a width of the vehicle body,
wherein the two or more flight control mechanisms are apart from each other in front and behind in a direction different from a direction of a rotation toward the lateral side of the vehicle body at the holder;
wherein the vehicle body comprises fixed shaft sections for the holders each of which are separately from each other and corresponds to each of the holders in the two or more flight control mechanisms;
wherein each of the holders are rotatably attached to the vehicle body with the corresponding shaft section for the holder used as a rotation axis so that each of the holders can rotate independently of each other;
the method comprises flying the unmanned aerial vehicle in a state where the first and the second preceding impactors of the respective flight control mechanisms are touching the boundary surface.

* * * * *